US006811088B2

(12) United States Patent
Lanzaro et al.

(10) Patent No.: US 6,811,088 B2
(45) Date of Patent: Nov. 2, 2004

(54) PORTABLE DATA COLLECTION SYSTEM

(75) Inventors: Michael Lanzaro, East Setauket, NY (US); Dominick H. Salvato, North Salem, NY (US); Ian Jenkins, Stony Brook, NY (US); D. Thomas McKinney, Coram, NY (US); Alistair Hamilton, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 131 days.

(21) Appl. No.: 09/772,469

(22) Filed: Jan. 30, 2001

(65) Prior Publication Data

US 2002/0000470 A1 Jan. 3, 2002

Related U.S. Application Data

(63) Continuation-in-part of application No. 09/304,296, filed on May 3, 1999, which is a continuation-in-part of application No. 09/010,908, filed on Jan. 22, 1998, now abandoned, which is a continuation-in-part of application No. 08/531, 492, filed on Sep. 21, 1995, now abandoned, which is a continuation of application No. 08/068,024, filed on May 28, 1993, now Pat. No. 5,416,310, application No. 09/772,469.
(60) Provisional application No. 60/179,225, filed on Jan. 31, 2000.

(51) Int. Cl.[7] .............................................. G06K 7/10
(52) U.S. Cl. .......................... 235/462.46; 235/462.01; 235/462.11; 235/462.24; 235/462.31
(58) Field of Search ................ 235/462.01, 462.11, 235/462.24, 462.31, 472.01, 472.02, 472.03, 383, 462.44, 462.45, 462.46

(56) References Cited

U.S. PATENT DOCUMENTS

| | | |
|---|---|---|
| 1,165,970 A | 12/1915 | Harris |
| 3,588,359 A | 6/1971 | Cribb |
| 4,251,798 A | 2/1981 | Swartz et al. |
| 4,286,145 A | 8/1981 | Palmer |
| 4,360,798 A | 11/1982 | Swartz et al. |
| 4,369,361 A | 1/1983 | Swartz et al. |
| 4,387,297 A | 6/1983 | Swartz et al. |
| 4,409,470 A | 10/1983 | Shepard et al. |
| 4,460,120 A | 7/1984 | Shepard et al. |
| 4,467,196 A | 8/1984 | Balliet et al. |
| 4,496,831 A | 1/1985 | Swartz et al. |
| 4,589,134 A | 5/1986 | Waldron |

(List continued on next page.)

FOREIGN PATENT DOCUMENTS

| | | |
|---|---|---|
| EP | 0264956 | 4/1988 |
| EP | 0 373 935 A3 | 6/1990 |
| EP | 0 471 291 A2 | 2/1992 |

OTHER PUBLICATIONS

"Pacific Report" Oct. 14, 1991 "Los Angeles Times".
"Popular Mechanics" Dec. 1998 issue—"Inside Blue Blue" by Steve Ditlea.

Primary Examiner—Michael G. Lee
Assistant Examiner—Ahshik Kim
(74) Attorney, Agent, or Firm—Hogan and Hartson LLP

(57) ABSTRACT

A portable data collection device has a display; manual data entry circuitry; a processor for receiving entered data and for controlling the display; a first wireless communication circuit for receiving data using a first protocol over short range from at least one data transmitting unit and a second wireless communication circuit using a second protocol for transmitting and receiving data over a long range from a host.

13 Claims, 22 Drawing Sheets

U.S. PATENT DOCUMENTS

| | | | |
|---|---|---|---|
| 4,593,186 A | 6/1986 | Swartz et al. | |
| D284,903 S | 8/1986 | Rose | |
| 4,607,156 A | 8/1986 | Koppenaal et al. | |
| 4,673,803 A | 6/1987 | Zerle et al. | |
| 4,719,462 A | 1/1988 | Hawkins | |
| 4,722,625 A | 2/1988 | O'Brien | |
| 4,736,095 A | 4/1988 | Shepard et al. | |
| 4,739,316 A | 4/1988 | Yamaguchi et al. | |
| 4,758,717 A | 7/1988 | Shepard et al. | |
| 4,760,248 A | 7/1988 | Swartz et al. | |
| 4,766,299 A | 8/1988 | Tierney et al. | |
| 4,794,239 A | 12/1988 | Allais | |
| 4,808,804 A | 2/1989 | Krichever et al. | |
| 4,816,660 A | 3/1989 | Swartz et al. | |
| 4,816,661 A | 3/1989 | Krichever et al. | |
| 4,825,057 A | 4/1989 | Swartz et al. | |
| 4,825,471 A | 5/1989 | Jennings | |
| 4,827,534 A | 5/1989 | Haugen | |
| 4,835,374 A | 5/1989 | Swartz et al. | |
| 4,845,650 A | 7/1989 | Meade et al. | |
| 4,871,904 A | 10/1989 | Metlitsky et al. | |
| 4,876,724 A | 10/1989 | Suzuki | |
| 4,896,026 A | 1/1990 | Krichever et al. | |
| 4,899,039 A | 2/1990 | Taylor et al. | |
| 4,916,441 A | 4/1990 | Gombrich | |
| 5,014,046 A | 5/1991 | Minami | |
| 5,105,067 A | 4/1992 | Brekkestran et al. | |
| 5,144,120 A | 9/1992 | Krichever et al. | |
| 5,191,197 A | 3/1993 | Metlitsky et al. | |
| 5,208,449 A | 5/1993 | Eastman et al. | |
| 5,210,398 A | 5/1993 | Metlitsky | |
| 5,212,372 A | 5/1993 | Quick et al. | |
| 5,272,324 A | 12/1993 | Blevins | |
| 5,276,315 A | 1/1994 | Surka | |
| 5,285,398 A | 2/1994 | Janik | |
| 5,304,786 A | 4/1994 | Pavlidis et al. | |
| 5,305,181 A | 4/1994 | Schultz | |
| 5,305,244 A | 4/1994 | Newman et al. | |
| 5,309,351 A | 5/1994 | McCain et al. | |
| 5,479,001 A * | 12/1995 | Kumar | 235/472.02 |
| 5,677,834 A | 10/1997 | Mooneyham | |
| 5,811,784 A * | 9/1998 | Tausch et al. | 235/472.01 |
| 5,844,824 A | 12/1998 | Newman et al. | |
| 5,873,070 A * | 2/1999 | Bunte et al. | 705/28 |
| 5,917,175 A * | 6/1999 | Miller et al. | 235/472.01 |
| 5,939,695 A * | 8/1999 | Nelson | 235/383 |
| 5,971,270 A * | 10/1999 | Barna | 235/375 |
| 6,006,100 A * | 12/1999 | Koenck et al. | 455/466 |
| 6,039,258 A * | 3/2000 | Durbin et al. | 235/472.01 |
| 6,058,304 A * | 5/2000 | Callaghan et al. | 455/422 |
| 6,065,679 A * | 5/2000 | Levie et al. | 235/462.47 |
| 6,119,941 A * | 9/2000 | Katsandres et al. | 235/462.07 |
| 6,138,914 A * | 10/2000 | Campo et al. | 235/472.01 |
| 6,149,063 A * | 11/2000 | Reynolds et al. | 235/472.02 |
| 6,290,134 B1 * | 9/2001 | Rando et al. | 235/472.01 |
| 6,394,355 B1 * | 5/2002 | Schlieffers et al. | 235/472.01 |
| 6,513,717 B2 * | 2/2003 | Hannigan | 235/462.45 |

* cited by examiner

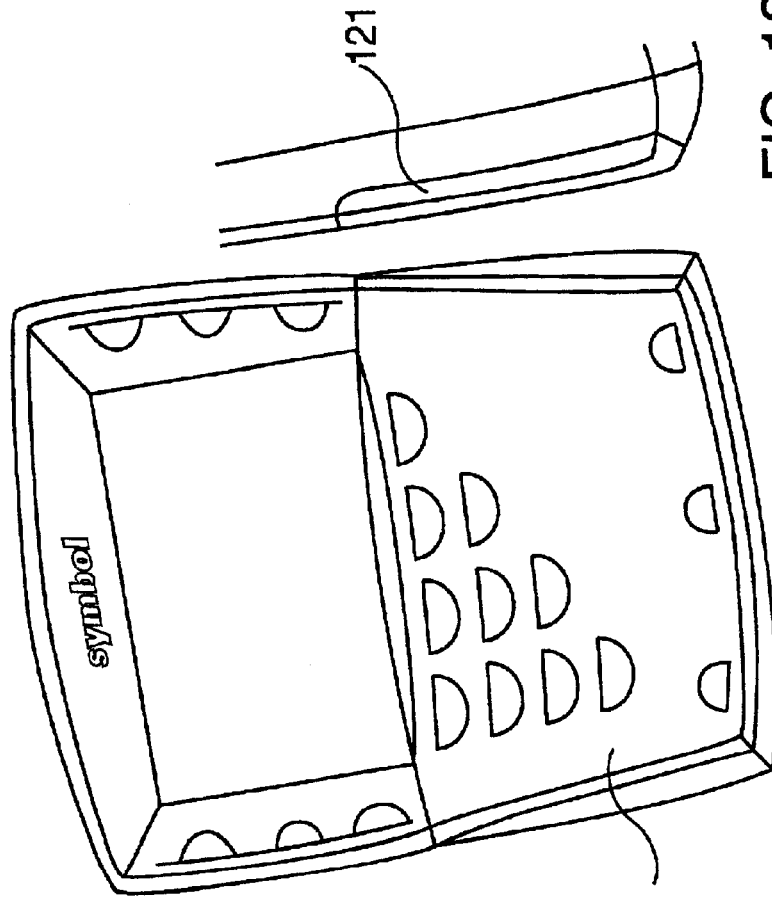
FIG. 12A
FIG. 12B
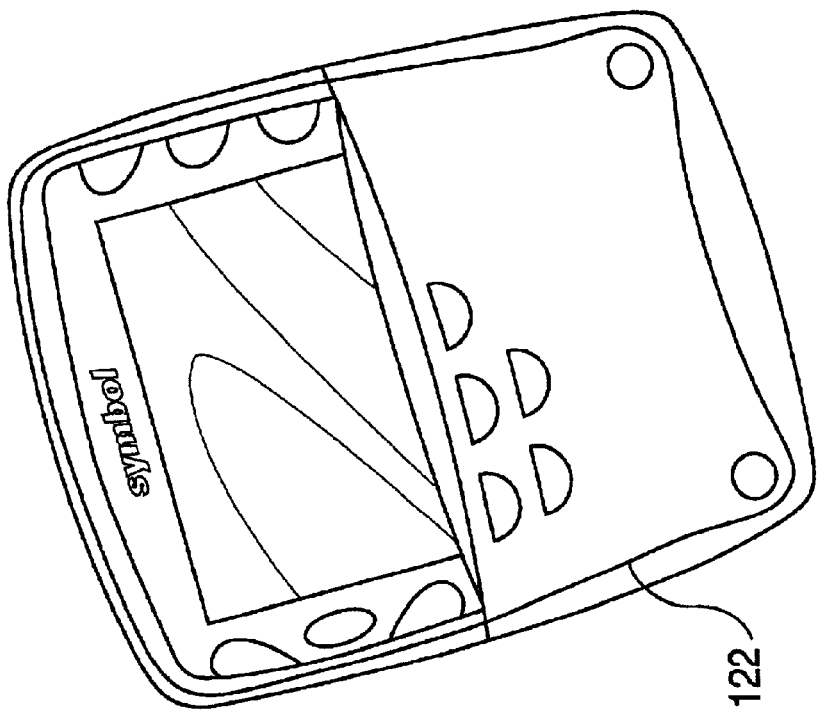
FIG. 12C

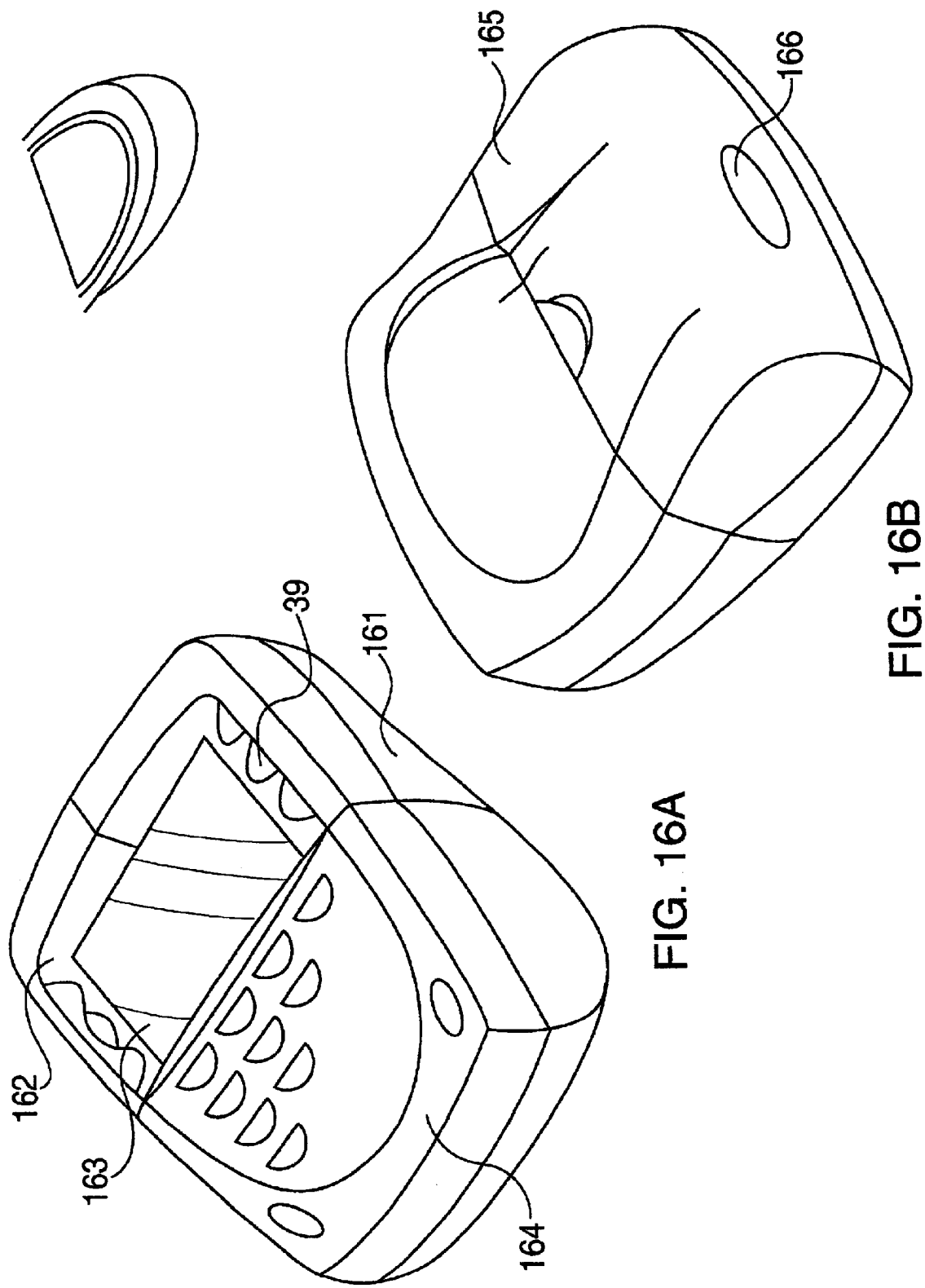

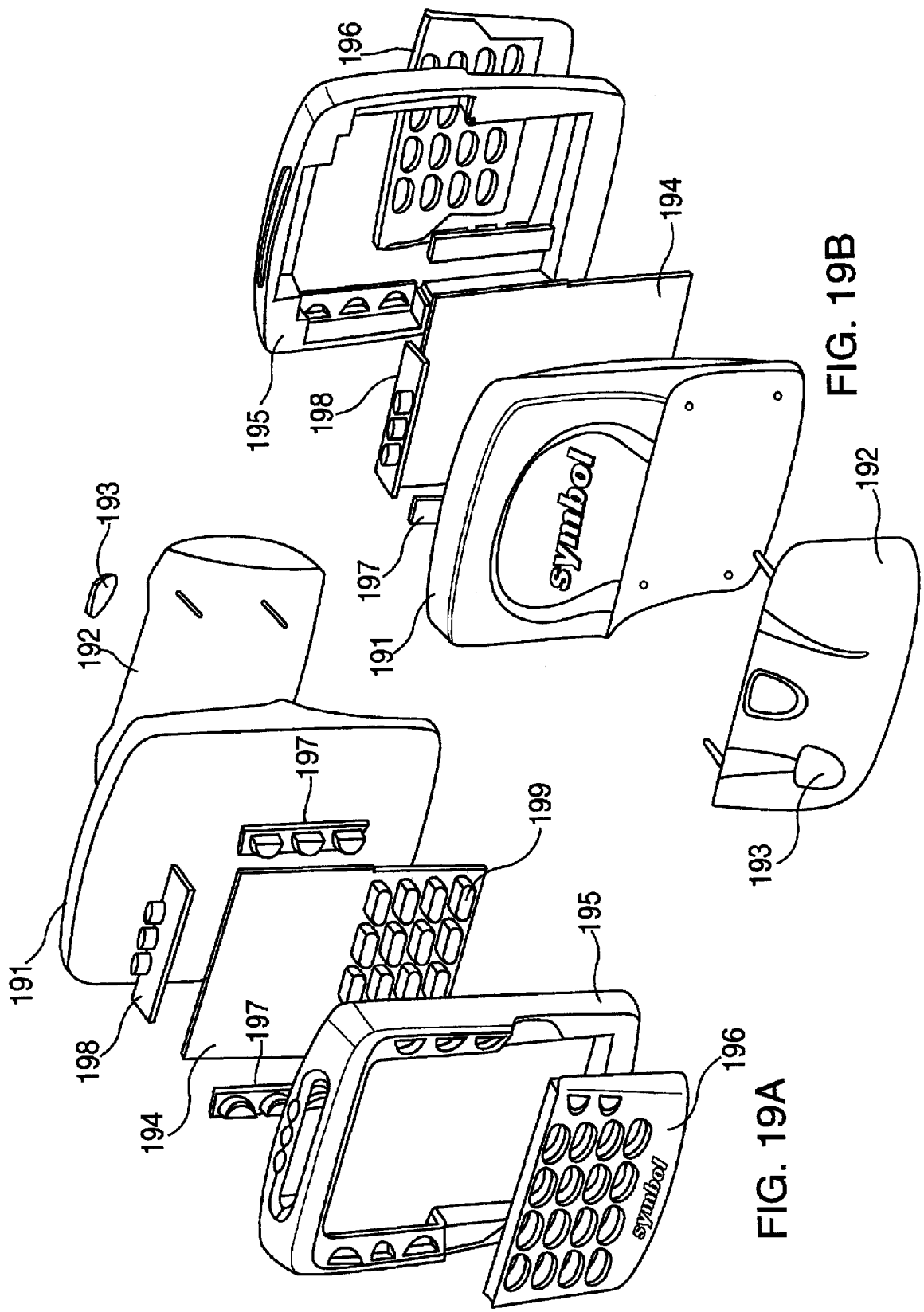

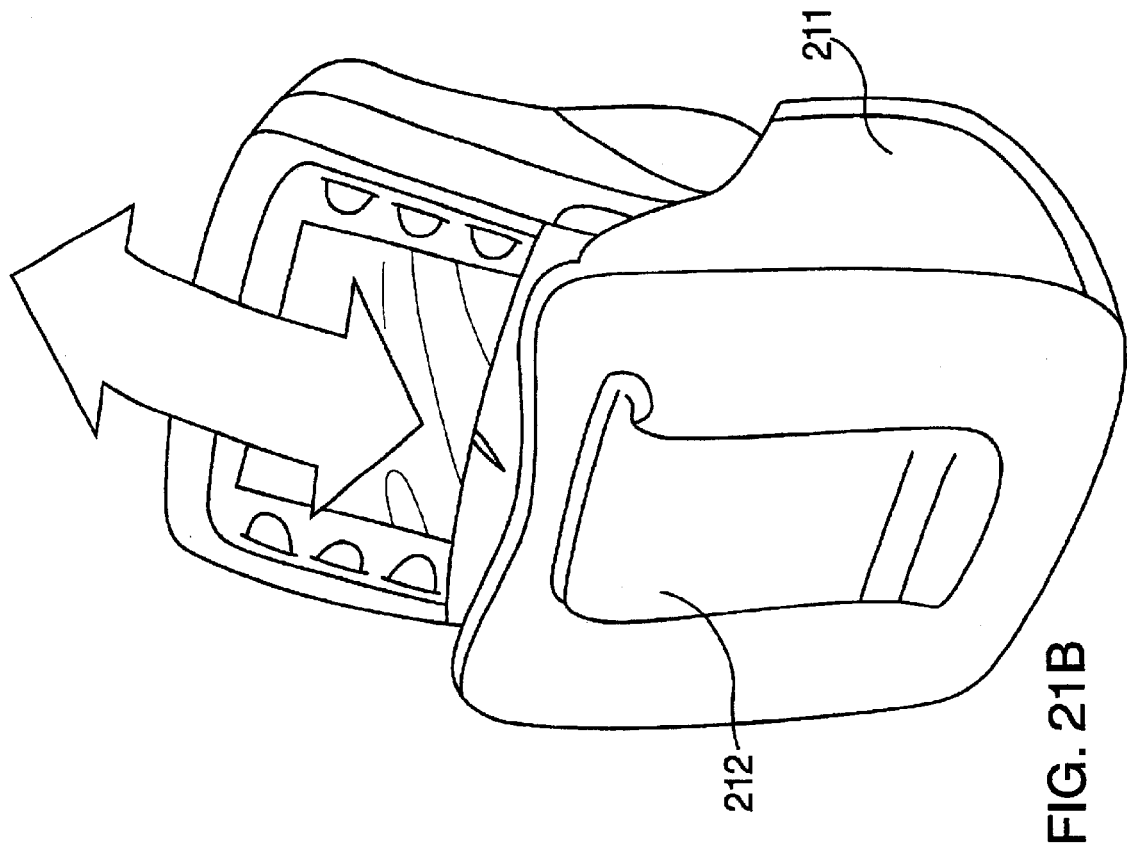
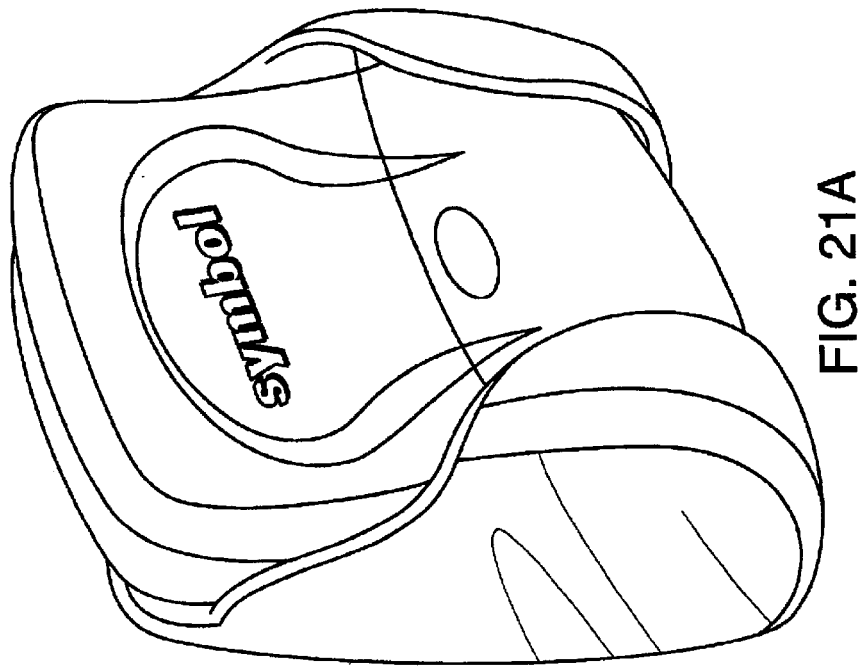
FIG. 21A
FIG. 21B

PORTABLE DATA COLLECTION SYSTEM

RELATED APPLICATIONS

This application is a continuation-in-part of U.S. application Ser. No. 09/304,296, filed May 3, 1999, which is a continuation-in-part of U.S. application Ser. No. 09/010,908 filed Jan. 22, 1998 now abandoned which is a continuation-in-part of U.S. application Ser. No. 08/531,492 filed Sep. 21, 1995 now abandoned which is a continuation of U.S. application Ser. No. 08/068,024 filed May 28, 1993 now U.S. Pat. No. 5,416,310, the disclosures of all of which are incorporated herein by reference. This application claims the benefits of the filing date of provisional application 60/179,225 filed Jan. 31, 2000. This application is related to U.S. application Ser. No. 08/381,516 filed Feb. 1, 1995, the disclosure of which is incorporated herein by reference.

FIELD OF THE INVENTION

The present invention relates to a portable computer or data collection system, typically including an optical scanner, or imager, wherein the system is to be worn by the system operator. The present invention also relates to a portable data communication system, typically including an optical scanner, or imager, wherein the system is distributed on an operator's body and wherein system components communicate with each other over a wireless communication network. The present invention also relates to a portable data communication system, typically including an optical scanner, or imager, being distributed on an operator's body and capable of communicating with other devices over a Local Area Network and/or a Wide Area Network.

BACKGROUND OF THE INVENTION

Optical readers, such as bar code readers, are now common. Typically, a bar code comprises a series of encoded symbols, and each symbol consists of a series of light and dark regions, generally in the form of rectangles. The widths of the dark regions, the bars, and/or the widths of the light spaces between the bars indicated the encoded information. A bar code reader illuminates the code and senses light reflected from the code to detect the widths and spacing of the code symbols and derive the encoded data.

Bar code reading type data input systems improve the efficiency and a accuracy of data input for a wide variety of applications. The ease of data input in such systems facilitates more frequent and detailed data input, for example, to provide efficient inventories, tracking of work in progress, etc. To achieve these advantages, however, users or employees must be willing to consistently use the bar code readers. Many applications require the operator to carry the bar code reader about as the operator moves from place to place and to operate the reader manually to scan codes appearing on different objects. The readers therefore must be easy d convenient to operate and carry.

Many applications additionally require use of the bar code reader with other data input means, for example, by incorporation of all the elements into a single integrated data input terminal. Such integrated systems typically include a keyboard for input of alphanumeric data which may or may not be related to bar code data, a central data processor unit having associated RAM and ROM, and a display. Integrated terminals of this type have been proposed which are small enough to be handheld (see e.g. U.S. Pat. Nos. 4,916,441 and 5,144,120). Such units incorporating so many different elements, however, tend to be larger than many dedicated bar code readers and cumbersome to operate as bar code readers, particularly for extended periods. Also, conventional integrated devices often require the operator to hold the device in one hand and operate the keyboard with the other. Such operation requires use of both hands and does not allow the user to perform other manual tasks at the same time. These problems, together with problems related to securing and carrying the integrated terminals when not in use, tend to discourage employees from using the data input system, thereby defeating the purpose of the system, and particularly, the advantages otherwise associated with bar code data entry. Similar problems exist in other types of portable computer or data devices.

From the above discussion of the state of the art, it becomes clear that a need still exists to produce portable computer or data input terminal systems, particularly ones incorporating an optical reader unit, which are particularly convenient to carry and operate.

In addition, the need exists to ergonomically distribute the elements of the data input terminal system on an operator's body.

The need also exists to wirelessly interconnect the different elements of the system on the operator's body.

Once the system consisting of different components has been incorporated to be worn on the operator's body, the need arises to be able to connect one operator with another operator having a similar system via a wireless communication channel.

In addition, the need arises to provide additional functionality to the operator, by interconnecting his system with a local area network (LAN), such as Bluetooth or an Ethernet, and/or wide area network (WAN), such as an internet.

The need also exists for a miniature voice communication system for enabling voice communication over a specified protocol, such as an Internet protocol, the system having voice recognition capabilities for hands free operation.

The need also exists to enable data transfers between the devices which are part of the personal area system and the devices attached to LAN or WAN.

The need also exists to enable voice and video data transfers between the elements of the personal area system and the devices attached to the LAN or WAN.

The need also exists to enable automatic voice recognition of the user commands made during the indicia reading operation of the personal area system.

SUMMARY OF THE INVENTION

The present invention addresses the above problems and needs through the design of a portable computer system with some of the system components worn by a user.

As used in this specification and in the appended in claims, the term "indicia" broadly encompasses not only symbol patterns composed of alternating bars and spaces of various widths commonly referred to as bar code symbols, but also other one or two dimensional graphic patterns, as well as alphanumeric characters. In general, the term "indicia" may apply to any type of pattern or information which may be recognized or identified by scanning energy across it and detecting reflected or scattered energy as a representation of variations in energy reflectivity at various points of the pattern or information. A bar code is one example of "indicia" which the present invention can scan, preferably by using an optical reading unit in the form of a small moving spot laser beam scanner. An optical scanner can also be in the form of a solid state imaging device, such as one-dimensional or two-dimensional CCD, or CMOS, scanners or imagers. Radio Frequency tags also represent a type of indicia carrying components which are interrogated using an RF interrogation scanner. RF scanners can be used in point-of-sale transactions and in electronic article surveillance (EAS) systems. For the purpose of the following discussion, an indicia type can mean only one of the different information carrying environments, and a scanner can mean any one of the corresponding indicia reading devices.

The invention is also directed at a new ergonomic allocation of scanning system components on an operator's body and in particular to the design of a portable data collection device. The scanning system comprises a headset, a scanning unit and a a portable data collection device having a computer for processing data and an input/output unit. The scanner can be a handheld or a wearable scanner, such as a ring scanner manufactured by Symbol Technologies, the assignee of the present invention. The ring scanner can communicate with the I/O unit over a wireless channel. The wireless channel could be an RF or an infrared channel.

In addition to the three components listed above, the system may also include additional peripheral components, such as a printer, a magnetic-stripe reader, heads-up display, tactile gauge-sensor or any other needed devices. The individual components communicate with each other using a wireless communication channel, preferably a short range communication channel, for example, Bluetooth. This wireless connectivity can be achieved via a short range local network, often called a Personal Area Network (PAN). The communication channel can be, but is not limited to, a radio frequency (RF), and infrared (IR), or an acoustic communication channel. Thus, communication with the bar code scanner is established via bi-directional or a unidirectional wireless link. In case this link is bi-directional, the bar code scanner includes only a transmitter Individual PAS's may be combined into a network of PAS's called a PAS cluster. PAS's in a particular PAS cluster can communicate with each other over a medium or a long range wireless communication channel, such as a Spectrum24 communication channel.

Regardless of the embodiment, and individual PAS gains access to a Local Area Network (LAN), such as an Ethernet, and/or a Wide Area Network (WAN), such an Internet, via an access point. Individual PAS's can use devices, such as servers and PC's situated either on the LAN or the WAN to retrieve and exchange information. Communication between the PAS's and the access point is carried out using a wireless communication protocol. An embodiment is disclosed where individual PAS components provide automatic speech recognition. PAS components may also act as a telephone, a pager, or any other communication device having access to a LAN or a WAN. Transmission of digitized voice and/or video data over an Internet link is also disclosed.

The invention also contemplates a miniature voice over IP (Internet Protocol) communication module capable of being designed into the headset unit having a speaker and a microphone. Alternatively, the module can be designed to be carried on other parts of the user's body for better ergonomic allocation of the user worn devices. The module is connected to another system component located either on the user's body, or a server located on a network, for voice recognition of user's commands. Thus, by providing voice recognition capabilities to a voice-over-IP communication module, the system allows for virtually hands-free operation of the phone module for communication purposes.

Additional objects, advantages and novel features of the invention will be set forth in part in the description which follows, and in part will become apparent to those skilled in the art upon examination of the following or may be learned by practice of the invention. The objects and advantages of the inventions may be realized and attained by means of the instrumentalities and combinations particularly pointed out in the claims.

Another object of the present invention is a portable data collection device for use in a portable data collection system having a display, manual data entry circuitry, a processor for receiving entered data and for controlling the display, a first wireless communications circuit for receiving data using a first protocol over short range from at least one data transmitting unit, and a second wireless communications circuit using a second protocol for transmitting and receiving data over a long range from a host. The processor is receptive of identification data relating to a transmitting unit for field associating the data transmitting unit with the portable data collection device. The data transmitting unit can be a bar code reader, and the identification data is information on a bar code associated with the portable data collection device and a unique identification of the data transmitting unit. In one embodiment, the bar code can be affixed to the portable data collection device. The processor can receive the unique identification of the data transmitting unit through the manual data entry circuitry in order to field associate the two.

A cradle can be provided for the transmitting unit and the processor can be receptive of the identification data relating to a cradle data transmitting unit to effect the field association. Moreover, the data transmitting unit can have a rechargeable battery which is recharged when the unit is cradled. This also creates a data collection device with modular scanning capability.

Another object of the present invention is to provide a portable data collection device having a touch sensitive display, manual data entry circuitry comprising a portion of the display and a processor for receiving entered data and for controlling the display to depict a keypad array of discrete pad areas, each representing at least one of the alphanumerics and icons on the display and corresponding data to be entered by actuating same. The processor can reconfigure the array of alphanumerics and icons for different operations. A first wireless communications circuit is provided for receiving data over short range over the data transmitting device and a second wireless communications circuit is provided for transmitting and receiving data over a long range from a host.

The processor can reconfigure the keypad array in anticipation of an action to be performed by a user. Preferably, a light pipe is disposed over each discrete keypad area of the keypad array and each light pipe is mounted for movement towards and away from the display to effect actuation of the key associated with the key pad array thereunder. In one embodiment, the light pipes are mounted on a resilient web. Moreover, the light pipe can have a lens on one end away from the display. In a preferred embodiment, a frame for the light pipes is provided which has an opening for each light pipe and is disposed over the display. The frame and light pipes can be mounted for displacement from the display to enlarge the area of the display for use by the processor. In that regard, the frame and light pipe can be slidably mounted for displacement away from the display or can be hingedly mounted for displacement away from the display.

In a further embodiment of the present invention, a data collection system has at least one data transmitting unit for scanning bar codes and for producing a decode signal representative of a scan bar code and having communication circuitry for the wireless transmission of the decode signal over a short range using a first protocol. A portable data collection device comprising a display, manual data entry circuitry and a processor for receiving entered data and for controlling the display, also has a first communication circuit for receiving data from the transmitting unit using the first protocol over a short range, and it has a second communication circuit using a second protocol for wireless transmission of data over a long range from a host.

The data transmitting circuit preferably comprises a light source, a scan element, a scan motor for moving the scan element, a photodetector, signal processing circuitry for receiving a signal from the photodetector, triggering circuitry for initiating a scan and power management circuitry for controlling the light source, scan motor and signal processing circuitry to stagger the activation thereof upon the initiating of a scan by the triggering circuitry. The data transmitting unit can further provide decode circuitry for decoding the signal received from the photodetector.

The system can also include a headset receptive of a voice input for producing voice signals and having communications circuitry for the wireless transmission of the voice signals over a short range using the first protocol. The processor can monitor the distance of the data transmitting unit from the portable data collection device to indicate when the distance exceeds the given distance. It is easy to lose a ring scanner or have theft of either piece of the system. When equipment becomes disassociated from the network or from its respective scanner/host pair, an alarm can indicate that devices are missing. This is a tracking system to prevent theft or loss of equipment.

The processor can control the display to depict a keypad array of discrete keypad areas, each representing at least one of alphanumerics and icons on the display and corresponding to data to be entered by actuating same and wherein the processor reconfigures the array of alphanumerics and icons for different operations.

The portable data collection device can have a cradle for docking one data transmitting unit. Moreover, the processor can configure the array on the display to depict at least one start scan key to initiate scanning on the data transmitting unit. The processor can reconfigure the array on the display to depict the start scan key for a right handed user and for a left handed user. The data transmitting unit is preferably associated with a portable data collection device, and the device communicates with each unit to lower the transmit power thereof. The portable data collection device communicates with each unit associated with it to agree to transmit at different time intervals. The portable data collection device can also communicate with each associated transmitting unit to detect the remaining available power in the unit to indicate power status to the user.

In a further embodiment of the present invention, a portable data collection device has the display, manual data entry circuitry and processor, as well as the first and second wireless communication circuits. A housing for the display, manual entry circuitry, processor and communication circuits has a connector for receiving a PC card and a PC card connector for adding functionality to the device.

In a still further embodiment of the present invention, the portable data collection device has a display, manual data entry circuitry and processor, as well as the first and second wireless communication circuits for short range and long range communications and the housing for the display, manual entry circuitry processor and communication circuits. The housing preferably has two separate sections having bosses for connecting the sections together and wherein the bosses are over molded with shock resistant material to provide a shock mount for components in the housing.

In a still further embodiment of the present invention, a portable data collection device has the display, manual data entry circuitry, processor and first and second wireless communication circuits for short range and long range communications and a housing for the display manual entry circuitry processor and communication circuits. A scan module is also mounted in the housing for pivotal movement and a manually actuated member on the outside of the housing pivots the scan module.

These and other objects, features and advantages of the present invention will be disclosed in more detail in the following detailed description with reference to the attached drawings wherein:

BRIEF DESCRIPTION OF THE DRAWINGS

FIGS. 3 and 4, 5A and 5B, 6A and 6B, 7A-7C, 8A and 8B, 9A-9C, 10A-10B, 11A-11B, 12A-12B, 13A-13D, 14A-14B, 15A-15C, 16A-16B, 17A-17C, 18A-18B, 19A-19B, 20A-20C and 21A-21B show various configurations for the portable data collection device of FIG. 1.

DETAILED DESCRIPTION OF THE INVENTION

Figure 1:
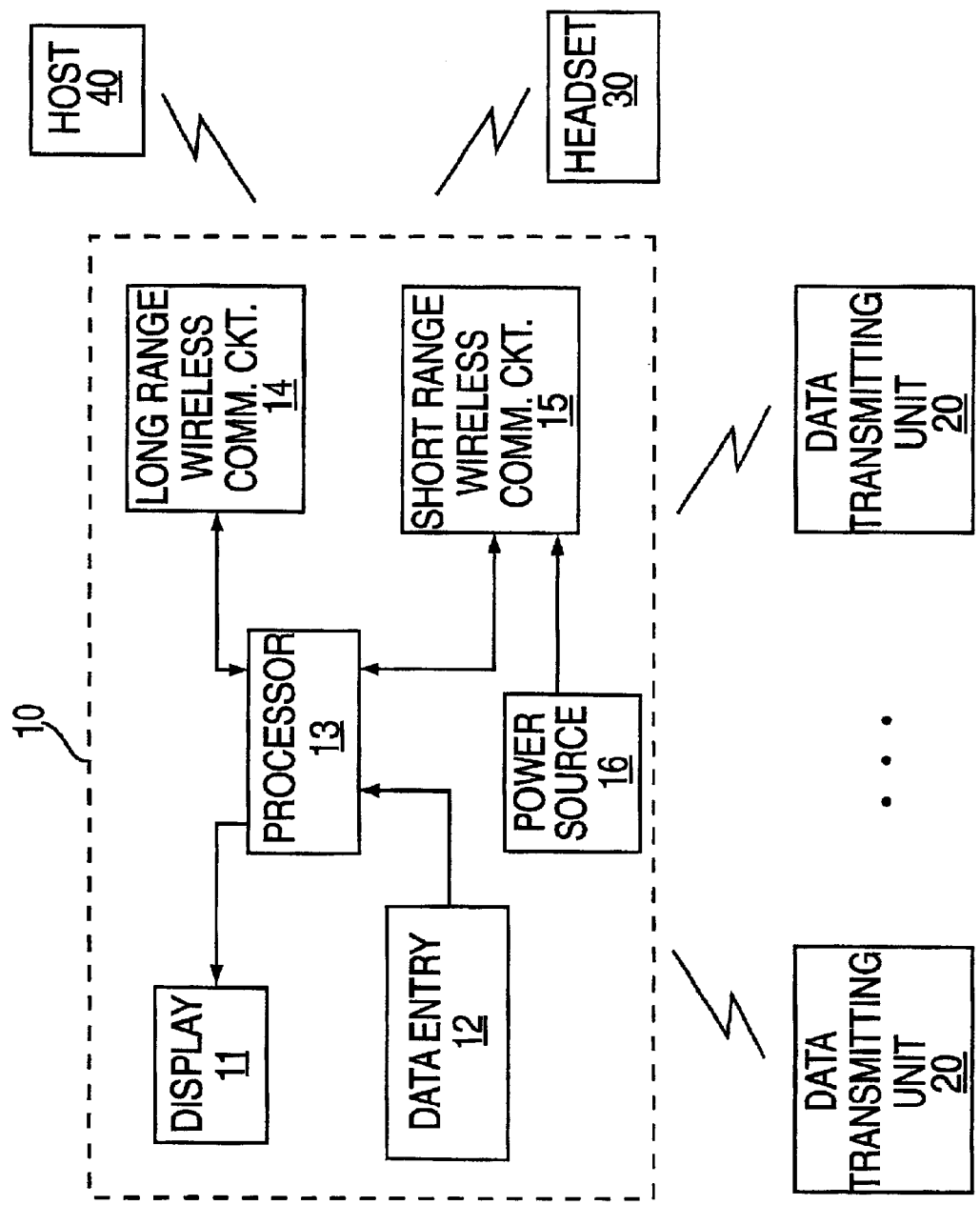
FIG. 1 is a block diagram of the data collection system according to the present invention.

FIG. 1 is a block diagram of the data collection system according to the present invention. The system includes a portable data collection device 10 that is wearable by a user and which communicates via a short range wireless communications protocol with a headset 30 and with one or more data transmitting units 20. The portable data collection device 10 also communicates via a long range wireless communication protocol with a host 40 to download information collected by the device 10 from the data transmitting units 20.

In accordance with the present invention, the portable data collection device 10 includes a display 11 which is preferably a liquid crystal display, however, any conventional display can be used. A data entry device 12 is provided, such as a keyboard, touch screen or the like for manual data entry into the portable collection device. The data is received by a processor 13, which is preferably a microprocessor, and data is displayed on display 11 through the processor 13.

The processor 13 is able to receive voice input from a headset 30 via a short range wireless communications protocol using a short range wireless communication circuit 15, such as a Bluetooth communications circuit or the like. Data transmitting units 20 also communicate with the short range wireless communications circuit 15 to input data into the portable data collection device 10. The processor 13 also receives and transmits data to a host computer 40 via a long range wireless communications protocol implemented by a long range wireless communication circuit 14. The unit is powered by one or more batteries in power source 16.

Figure 2:
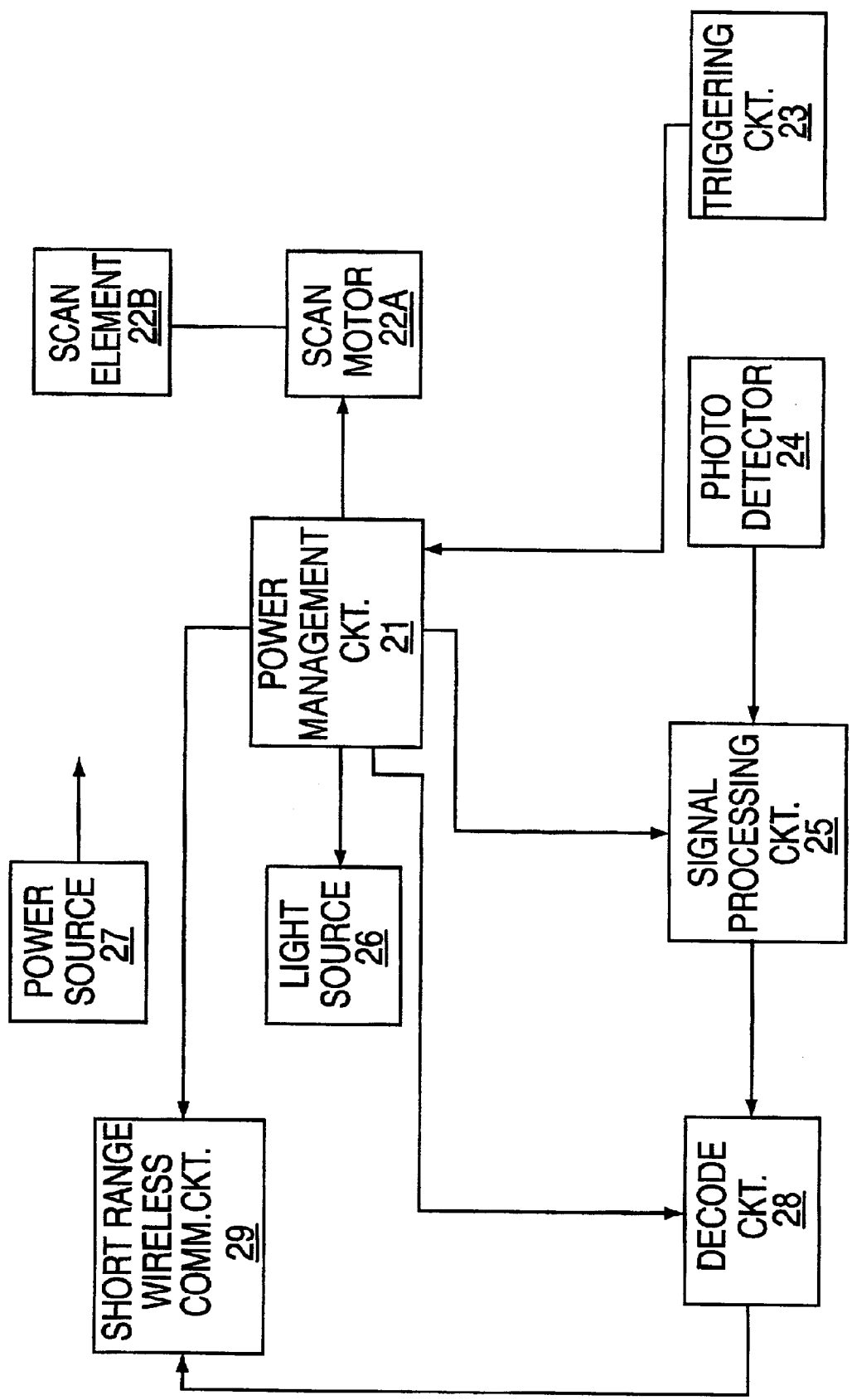
FIG. 2 is a block diagram of the data transmitting unit of FIG. 1.

One embodiment of the data transmitting unit 20 is shown in a block diagram of FIG. 2. The data transmitting unit 20, in one preferred embodiment, is a bar code scanner unit which includes a light source 26, such as a laser diode, a photodetector 24 and a scan element 22B which receives the light from the light source 26 and scans it across a bar code for reading. The light reflected from the bar code is received by the photodetector 24 and converted to signals which are processed by a signal processing circuit 25 and decoded in a decoder circuit 28. The scan element 27 is moved by a scan motor 22A which preferably oscillates the scan element to effect the moving of a beam across a bar code.

Scanning is begun by a triggering circuit 23 which can react in response to the pushing of a button to initiate scanning by the scan element or by object detection or other conventional techniques.

Special power management control will be used in the (terminal) data receiving device. Since the transmitted data is asynchronous, it is best for power conservation to leave the terminal in a sleep mode and generate a "wake up" on the receiving of data. A low power microcontroller could be used for this purpose. It would in turn wake up the main terminal (host) processor.

A power management circuit 21 controls the actuation of each of the elements in response to the triggering circuit input. For example, in order to minimize the load on a power source for the data transmitting unit, which can be a rechargeable battery of the like, the scan motor is first turned on to get up to speed before the light source is turned on. Thereafter, the signal processing circuit is actuated and the decode circuit is turned on last. After a successful scan, the scan motor and light source are preferably turned off followed by the decode circuit and signal processing circuitry. The decoded data is communicated to the portable data collection device by short range wireless communication circuit 29. The unit is powered by one or more batteries in power source 27.

Various configurations for the portable data collection device 10 are shown in FIGS. 3 and 4, 5A and 5B, 6A and 6B, 7A-7C, 8A and 8B, 9A-9C, 10A-10B, 11A-11B, 12A-12B, 13A-13D, 14A-14B, 15A-15C, 16A-16B, 17A-17C, 18A-18B, 19A-19B, 20A-20C and 21A-21B.

Figure 22:
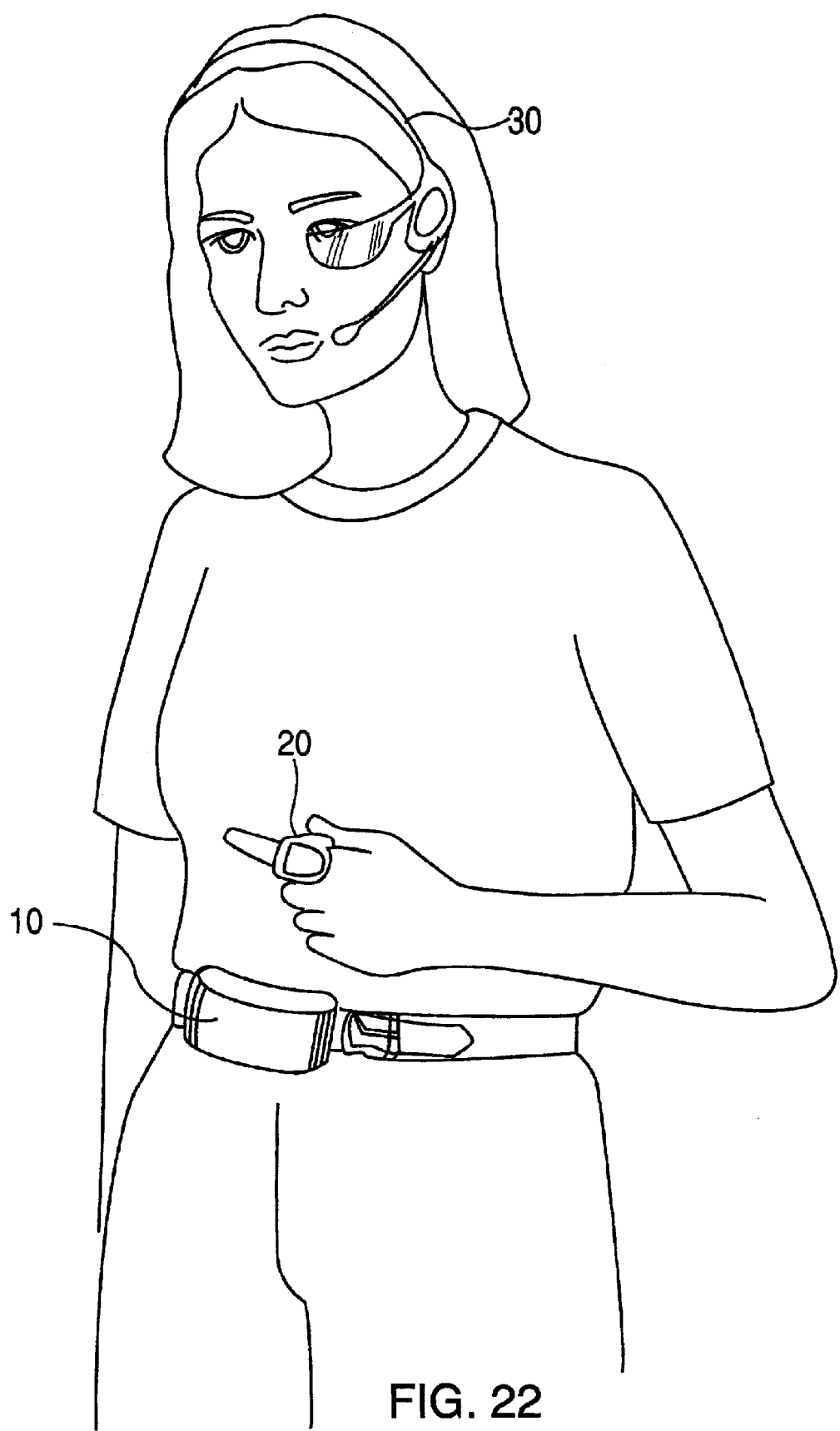
FIG. 22 shows the wearable system of FIG. 1.
Figure 23:
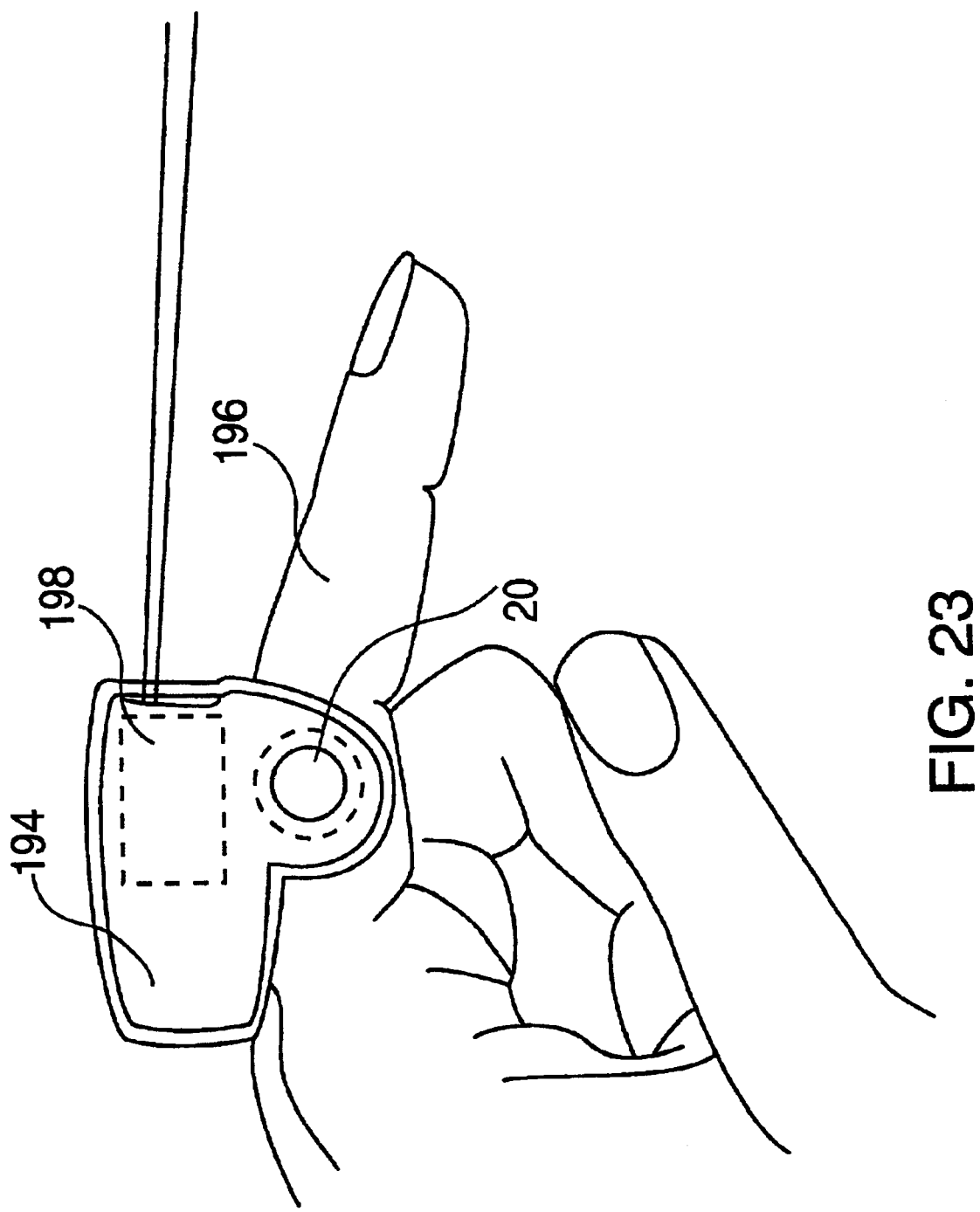
FIG. 23 shows one embodiment of the data transmitting unit.

The wearable system is shown in FIG. 22 and one embodiment of the data transmitting unit is shown in FIG. 23.

Figure 4:
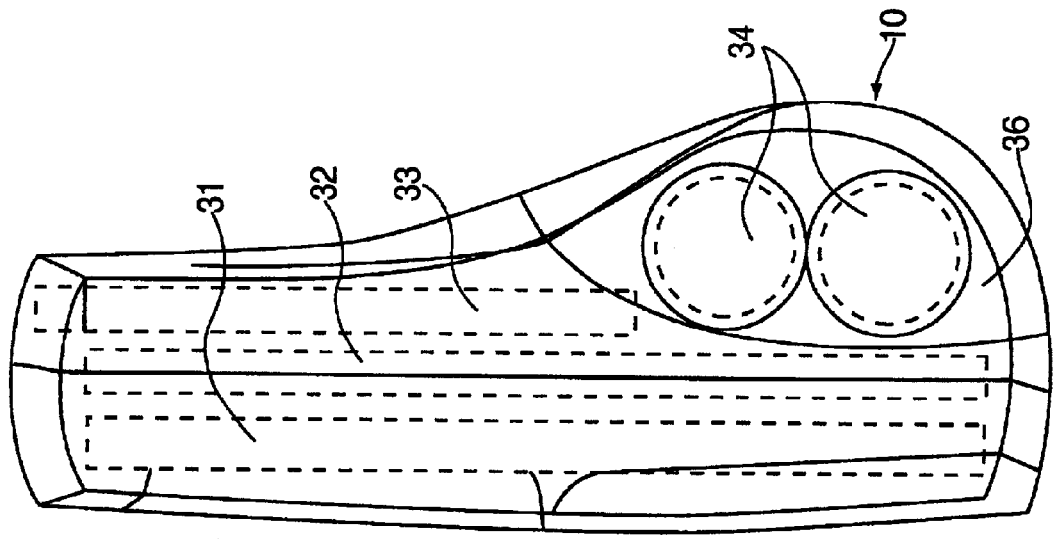
Figure 3:
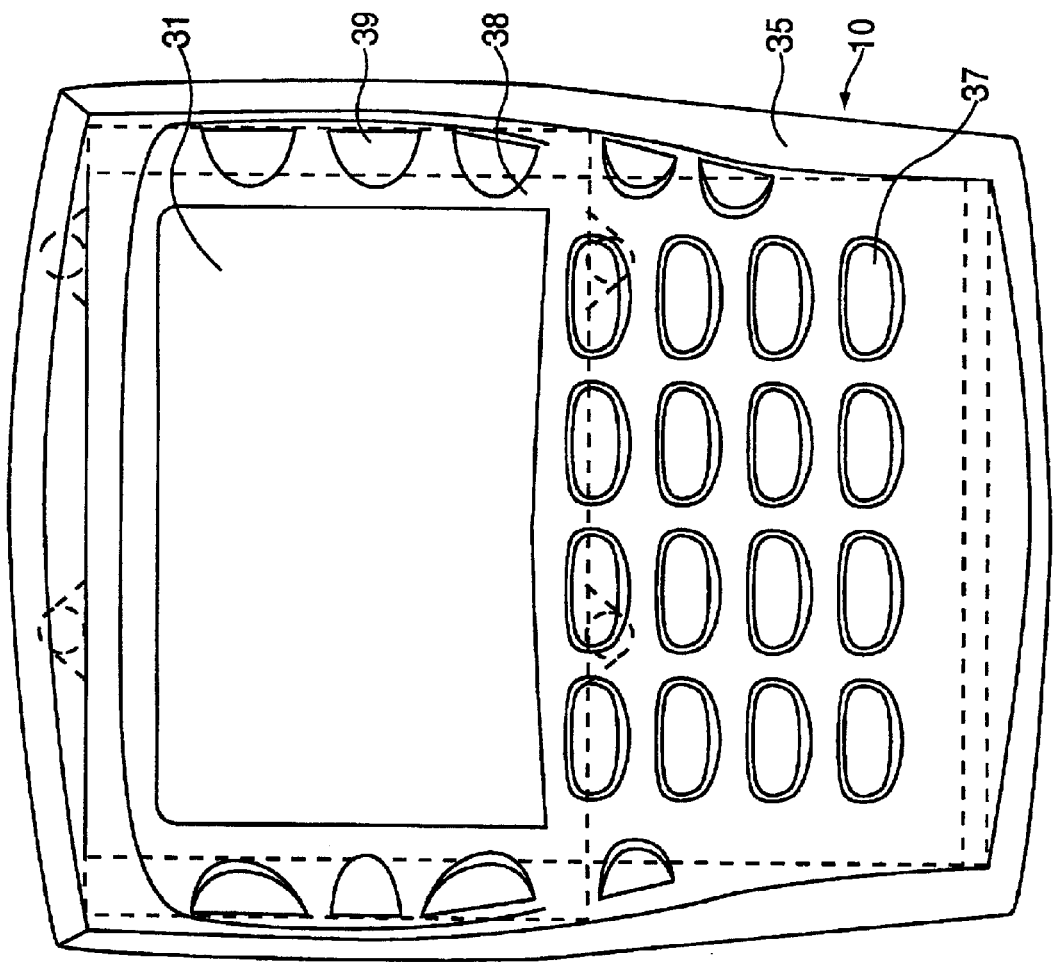

FIGS. 3 and 4 show one configuration of the portable data collection device 10 of FIG. 1. In these figures, the portable data collection device is labeled 31 and includes a housing 35 having a battery compartment 36 with batteries 34 therein. Within the housing is a radio module 33 which has the first and second wireless communication circuits for receiving data using a first protocol over short range, such as Bluetooth, and a second wireless communication circuit using a second protocol for transmitting and receiving data over a long range. Also, within the housing is a printed circuit board 32 having the microprocessor and other associated circuitry thereon and a touch screen display 31 disposed thereover. On the display is the keyboard 37, the details of which will be explained later with regard to other figures. On the display is frame 38 which mounts function keys 39 which will be described hereinafter.

Figures 5A, 5B:
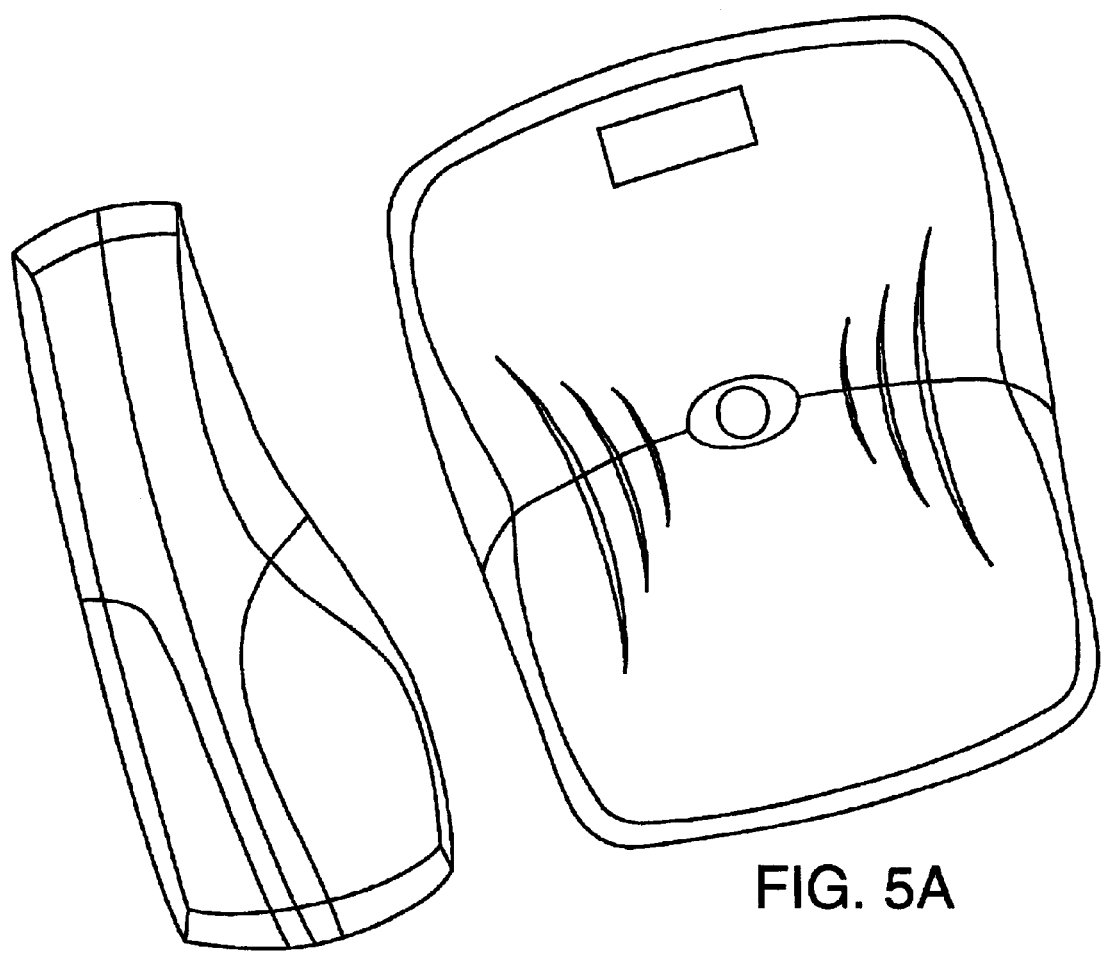
Figures 6A, 6B:
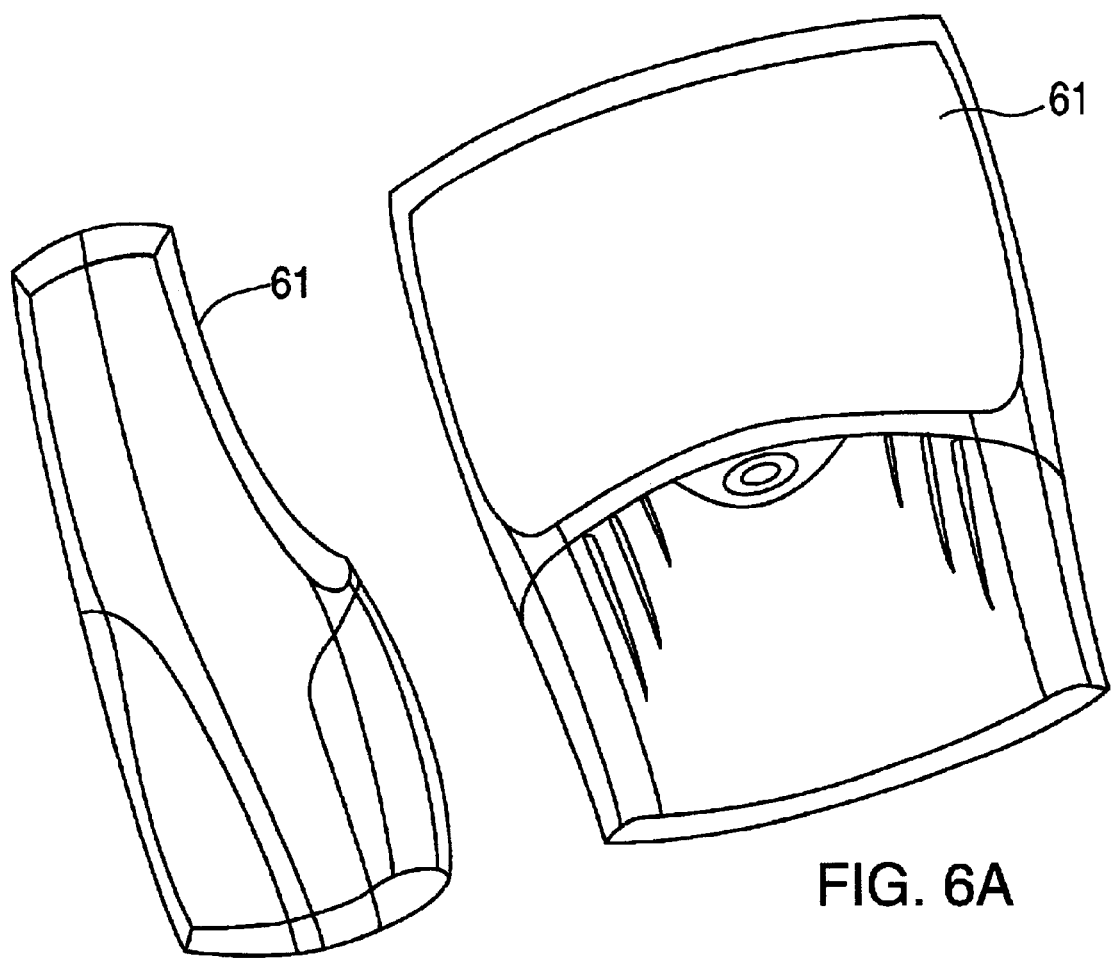

FIGS. 5A and 5B show a rear view and a side view of the housing 35 illustrating the simple continuous surface of the housing 35. FIGS. 6A and 6B show an alternative configuration of the housing to provide a different gripping surface 61 at the lower end of the rear of the device.

Figure 7A:
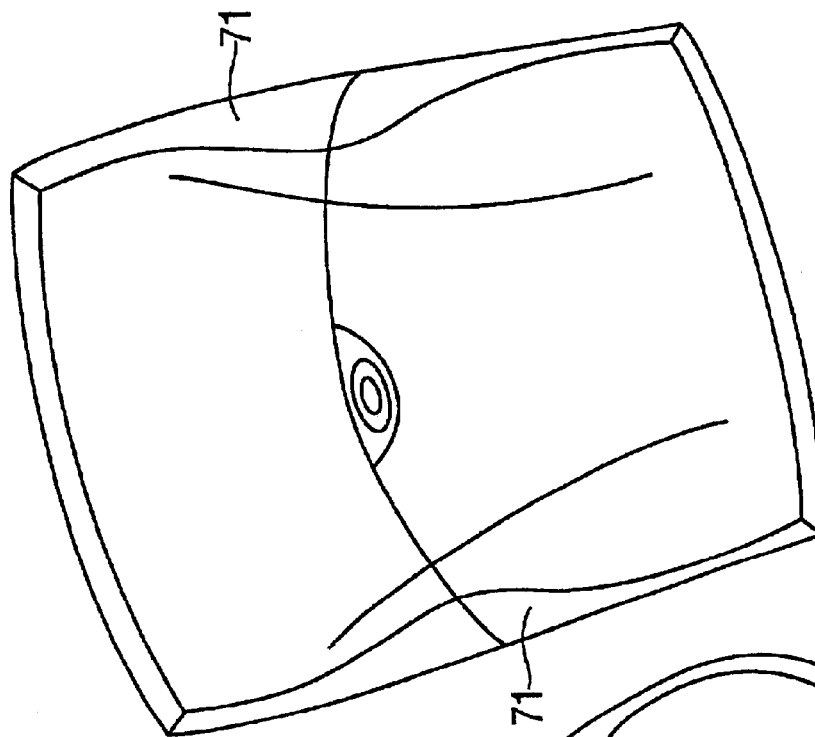
Figure 7B:
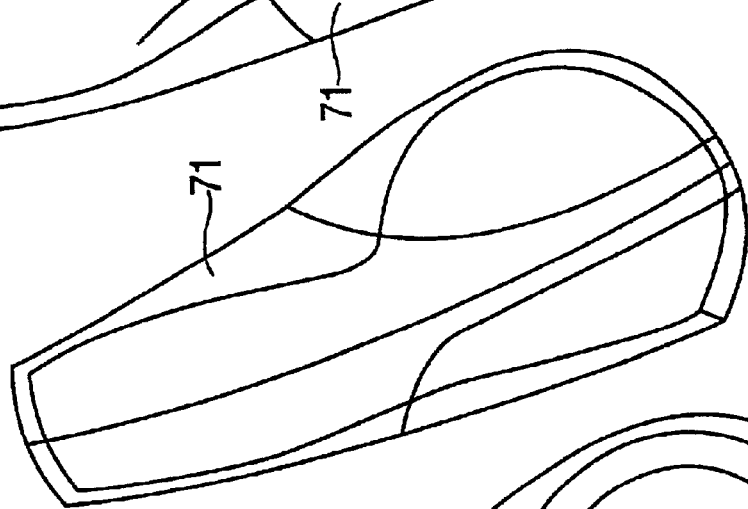
Figure 7C:
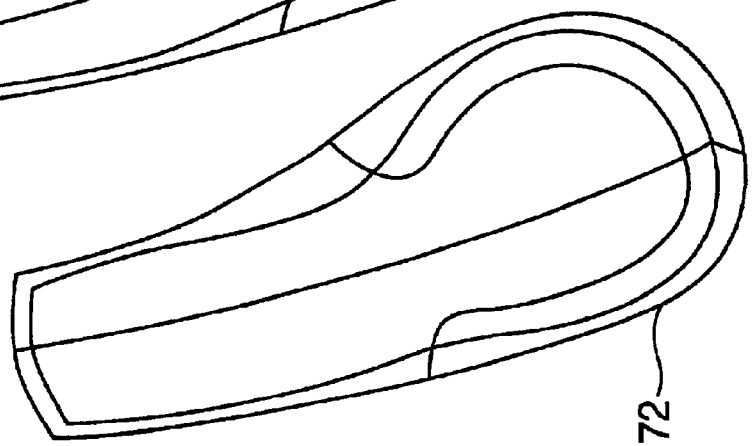

FIGS. 7A and 7B show an alternative of the housing wherein a finger notch 71 is provided and FIG. 7C shows a further alternative to the housing wherein the top end of the housing 72 is fully round.

Figure 8A:
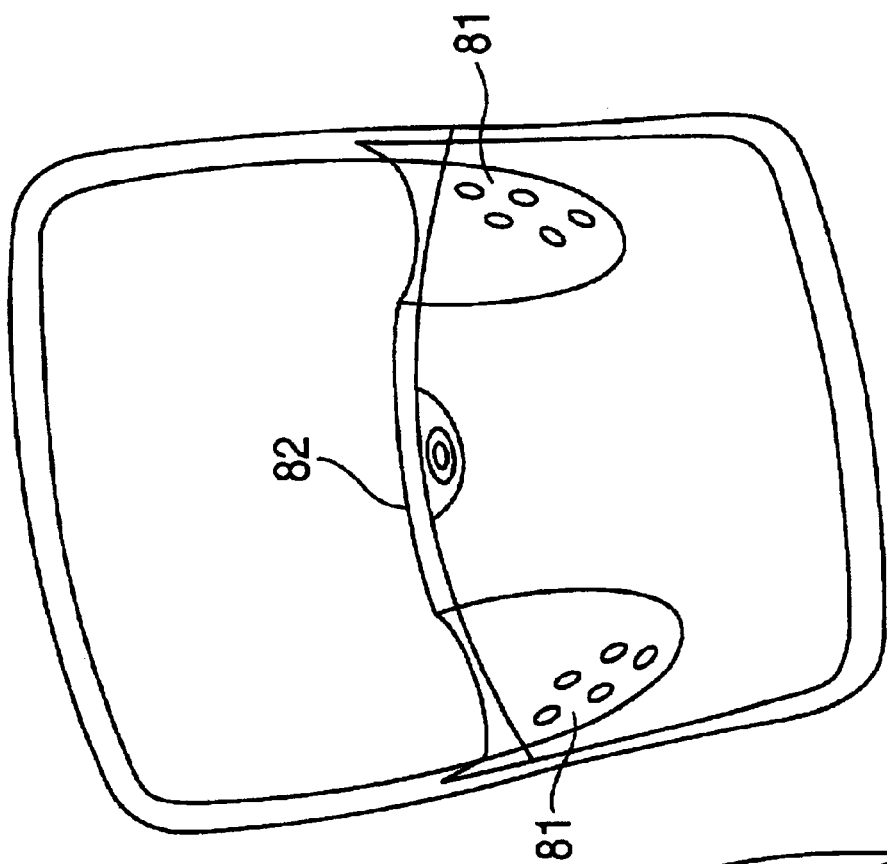
Figure 8B:
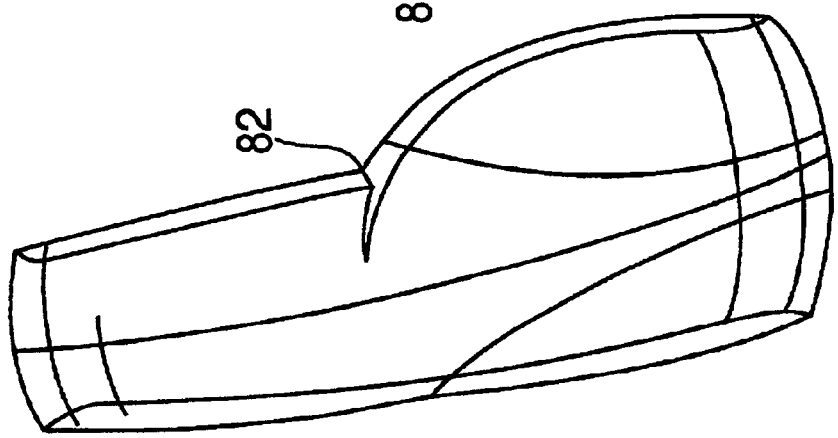

FIGS. 8A and 8B show a still further embodiment of the housing wherein valleys 81 are provided for fingers and wherein the lower and upper halves of the housing meet at a distinct line 82.

Figure 9B:
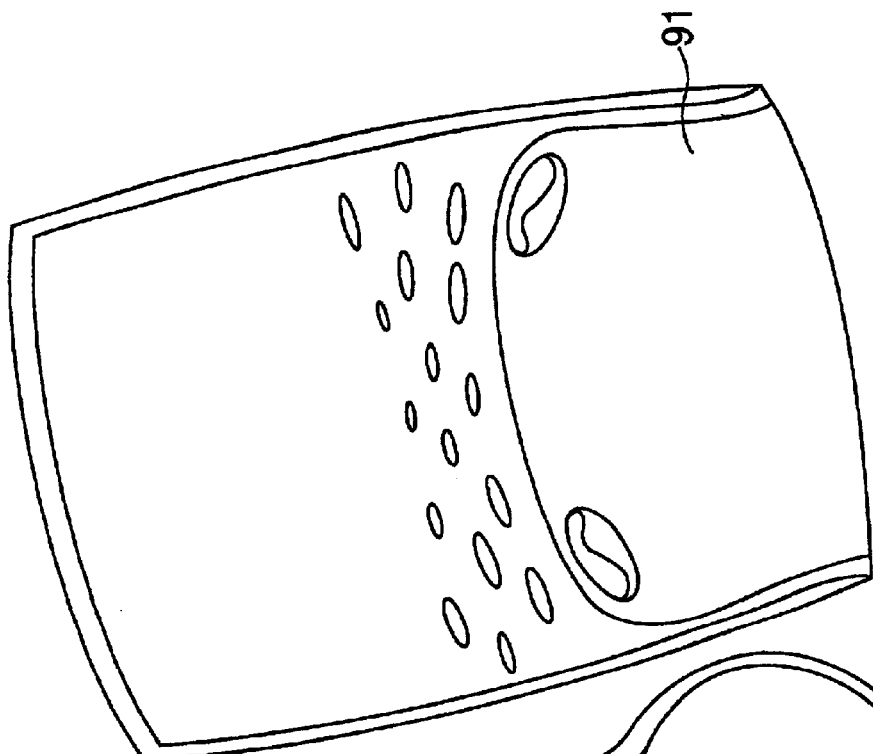
Figure 9C:
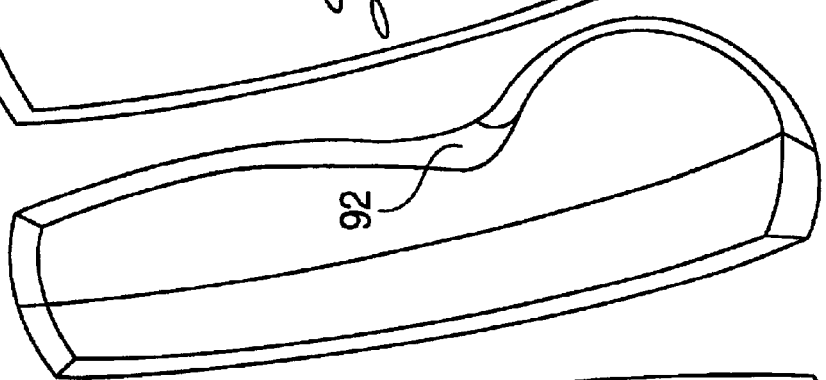
Figure 9A:
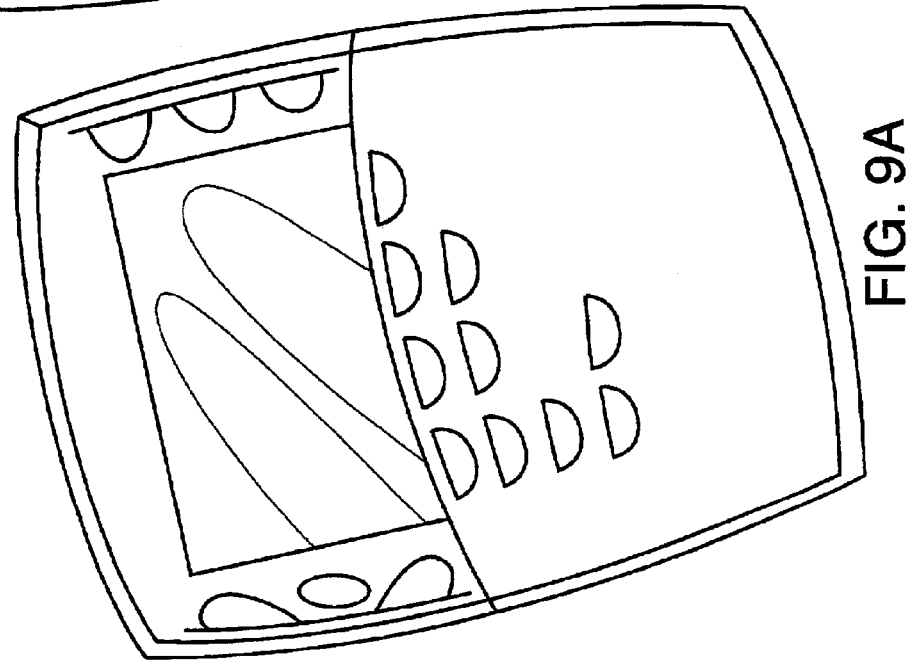

FIGS. 9A-9C show a still further alternative for the housing of the portable data collection device wherein the battery compartment door 91 is configured differently, and a finger notch 92 is provided towards the center of the housing in the rear.

Figure 10A:
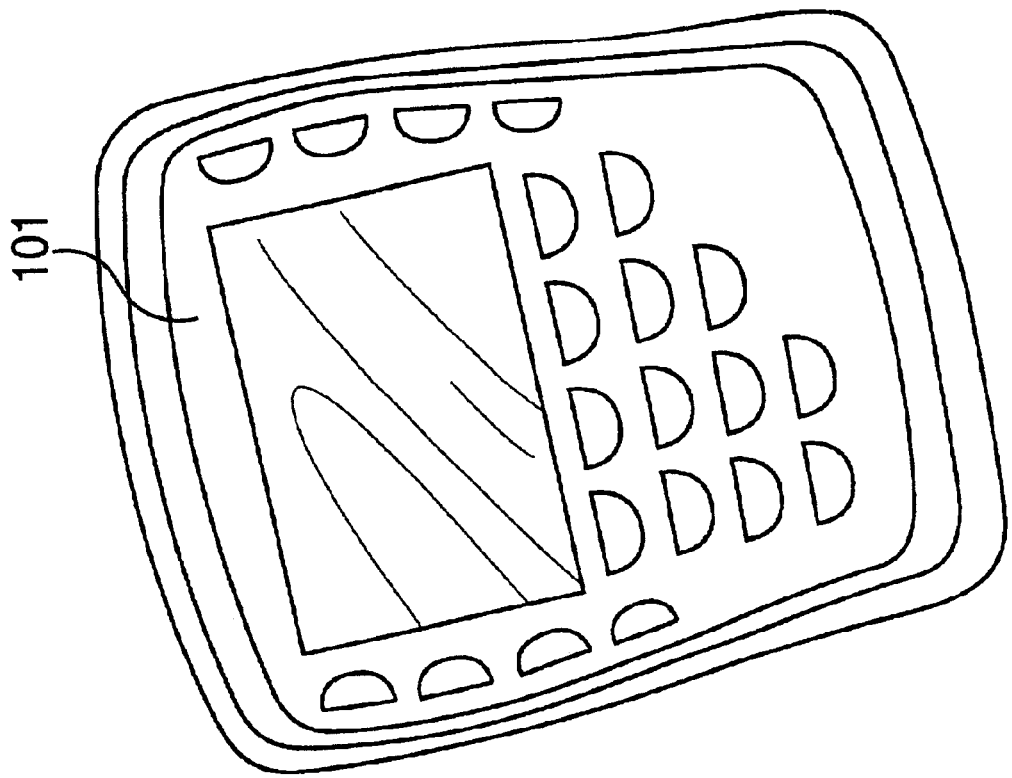
Figure 10B:
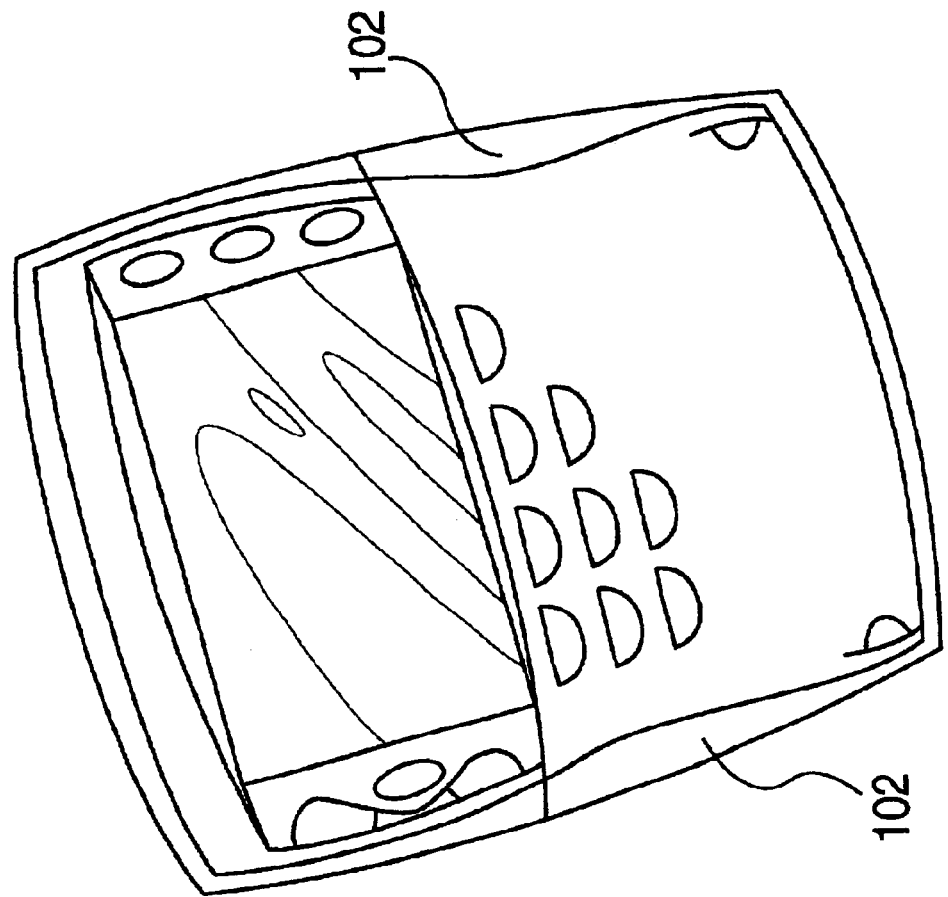

FIGS. 10A and 10B show alternative embodiments of the front of the portable data collection device wherein the display is framed by a rubber cover member 101 that has openings for keys, as shown in FIG. 10A, and which alternatively has a waistline 102 in FIG. 10B.

Figure 11A:
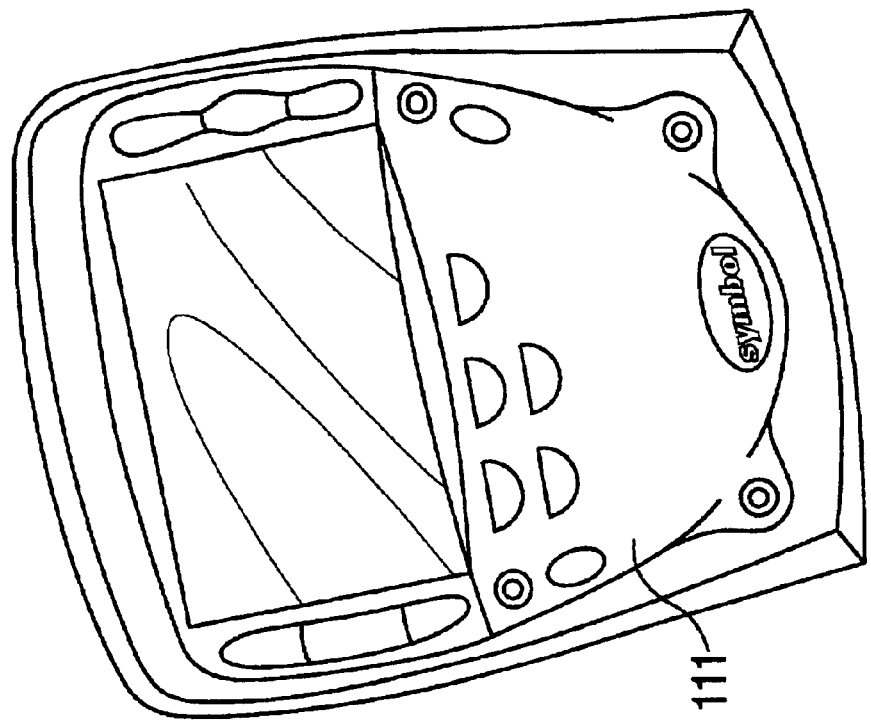
Figure 11B:
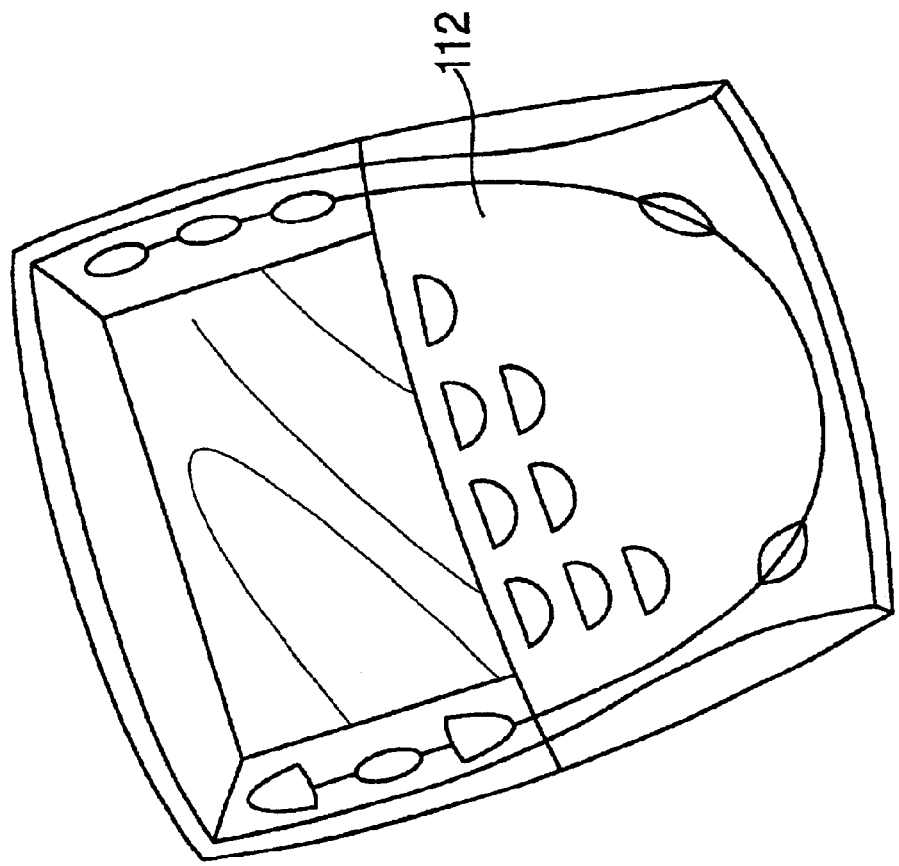
Figures 13A, 13B, 13C, 13D:
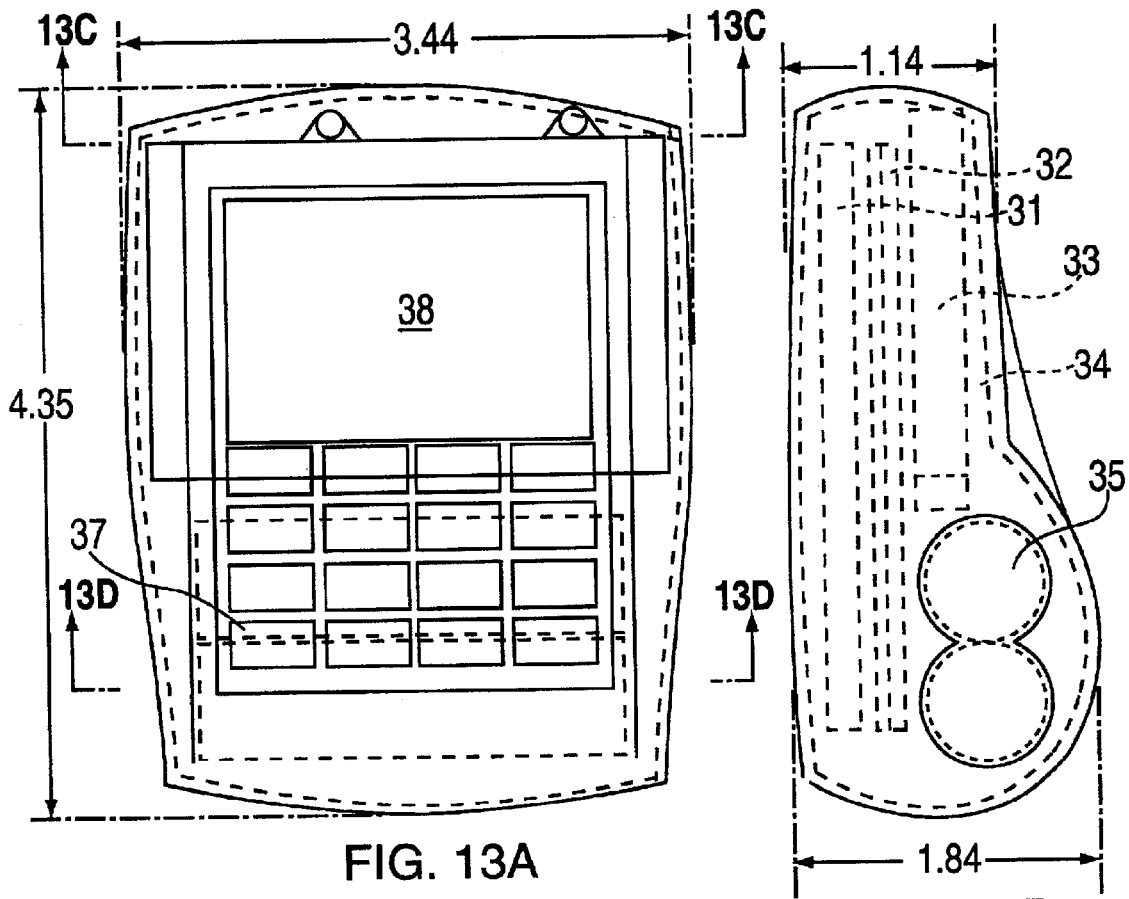

FIGS. 11A and 11B show alternative configurations for the rubber overlay referenced as 111 and 112 respectively.

FIGS. 12A and 12B depict a further alternative embodiment of the housing wherein a thin rubber frame 121 is provided over the display. In FIG. 12C, a further alternative embodiment is shown wherein the thin rubber 122 is within the housing edge.

FIGS. 13A-13D show various views of the portable data collection device depicted in FIGS. 3 and 4 to show the relative positioning of the elements therein.

Figure 14B:
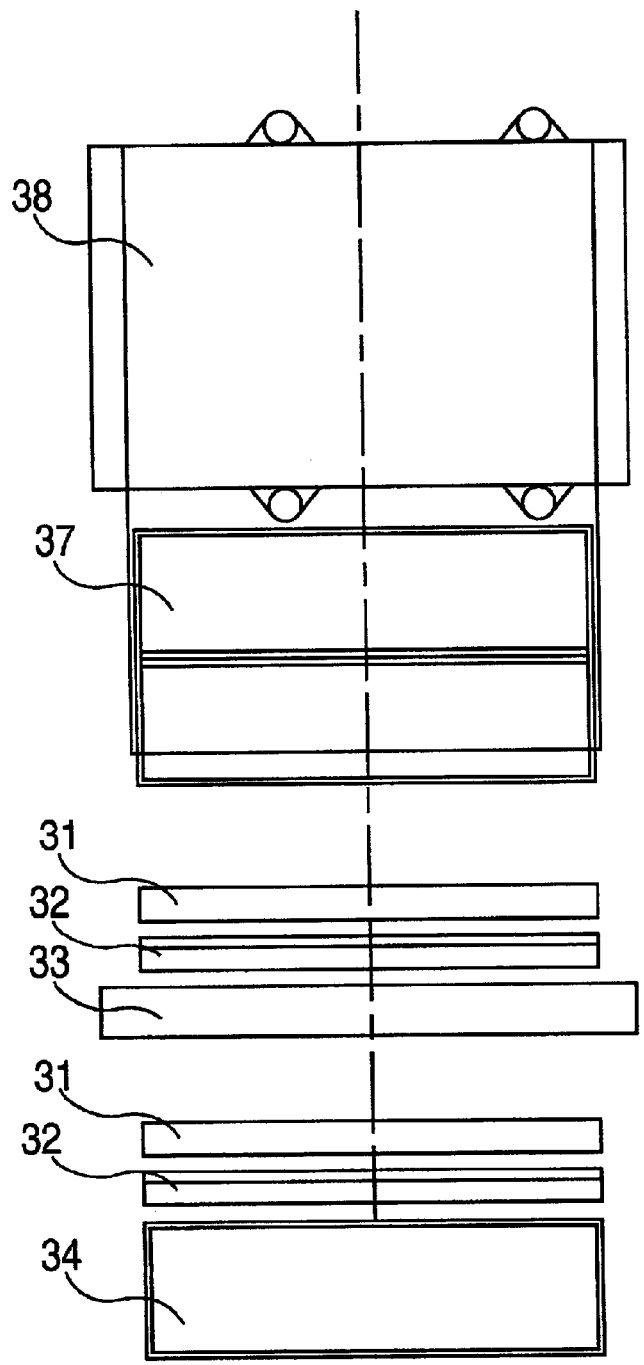
Figure 14A:
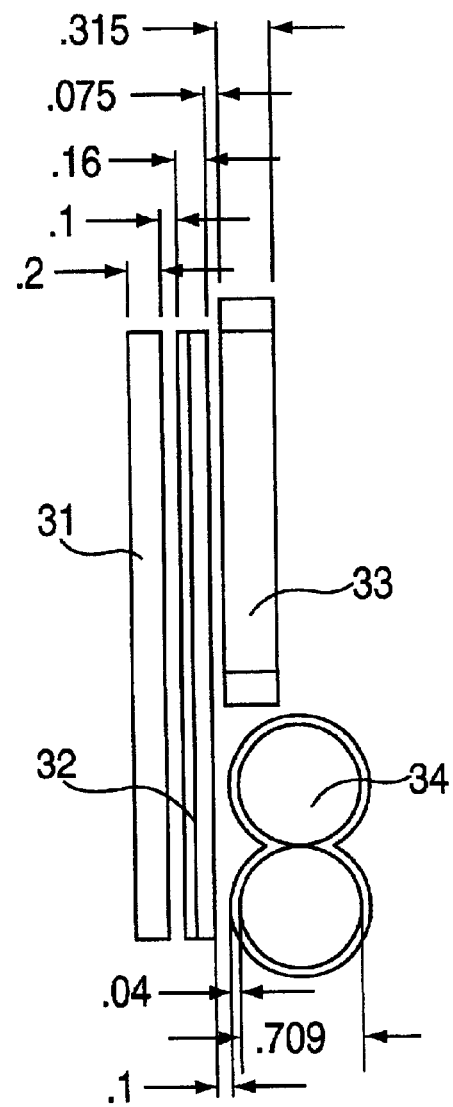

FIGS. 14A and 14B show the elements of FIGS. 13A-13D without the housing.

Figure 15C:
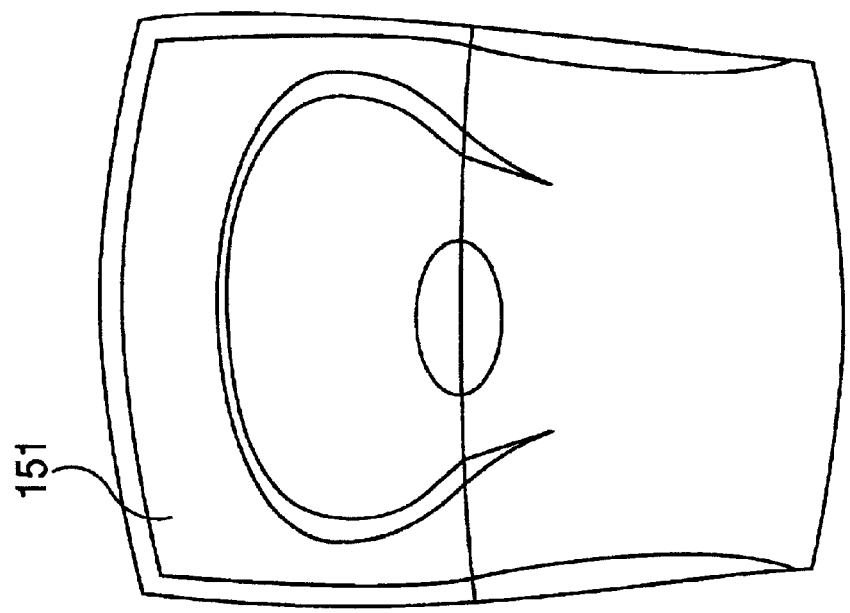
Figure 15B:
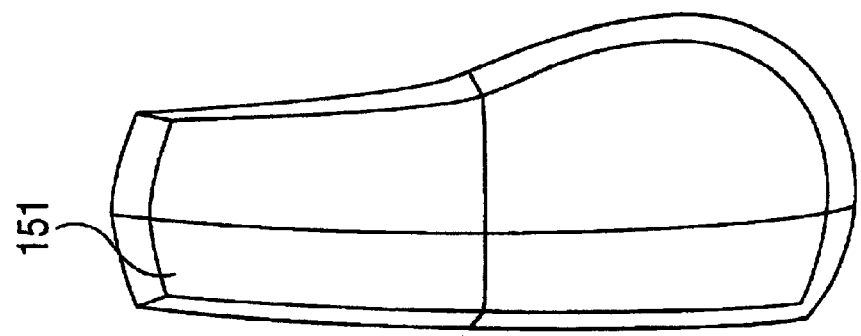
Figure 15A:
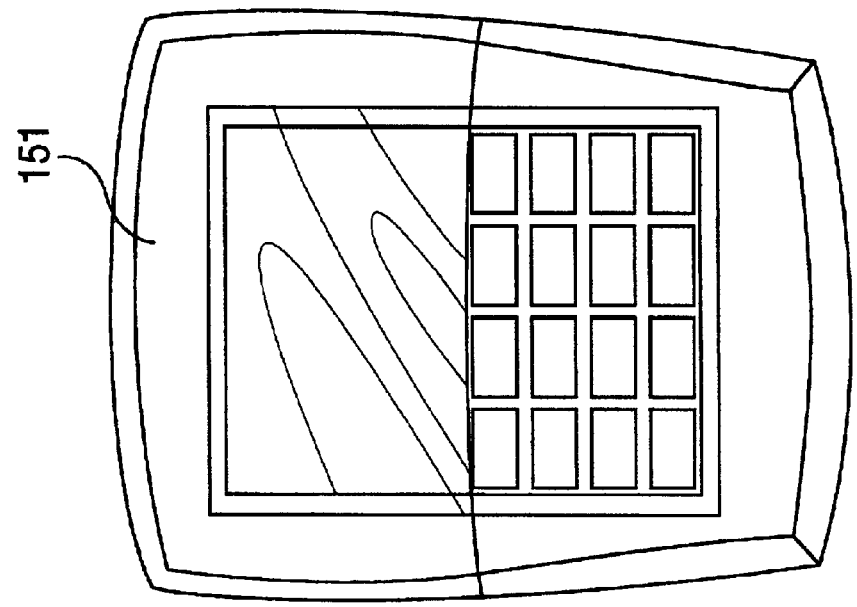

FIGS. 15A-15C show an alternative embodiment of the portable collection device housing 151.

FIGS. 16A and 16B show a still further alternative embodiment for the housing described in more detail as follows. As shown therein, the housing 161 has a bevel 162 around display 163 and the function keys 39 are in the bevel 162 as shown. Moreover, the housing is molded into the rubber keypad frame 164. On the rear of the housing is revealed contacts 166 for cradling the device and a softened bottom surface 165 for an easier grip.

Figure 17C:
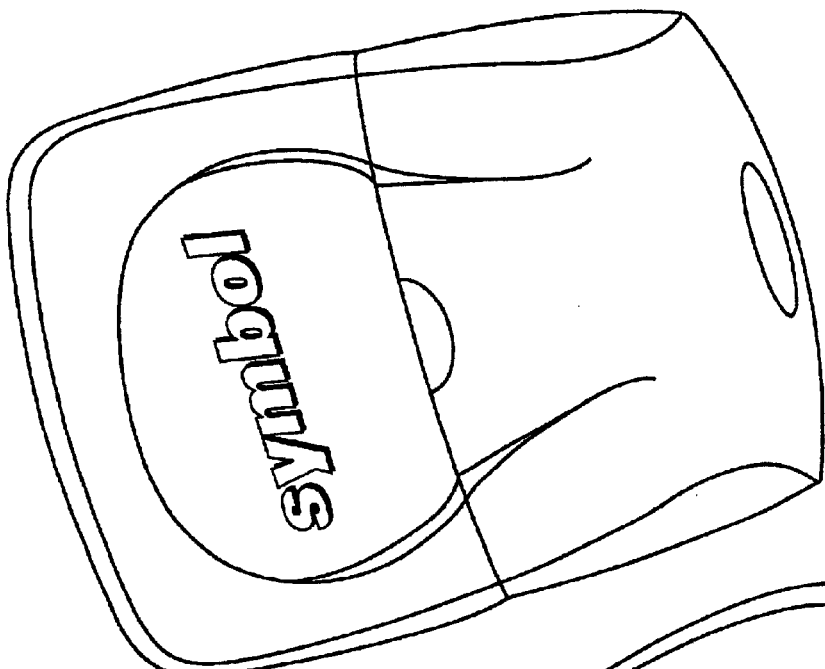
Figure 17B:
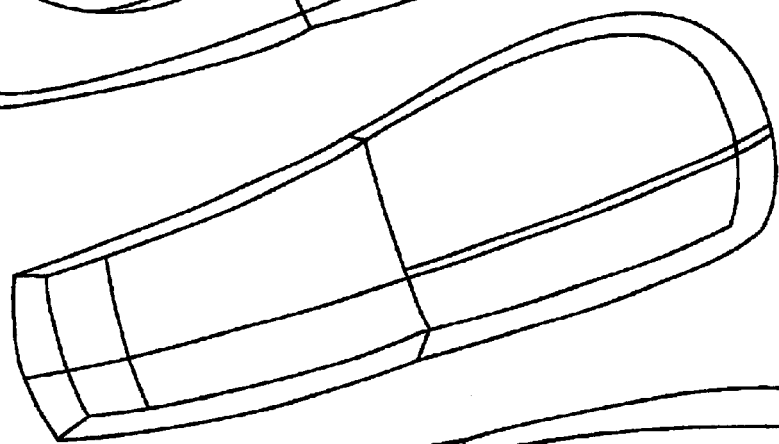
Figure 17A:
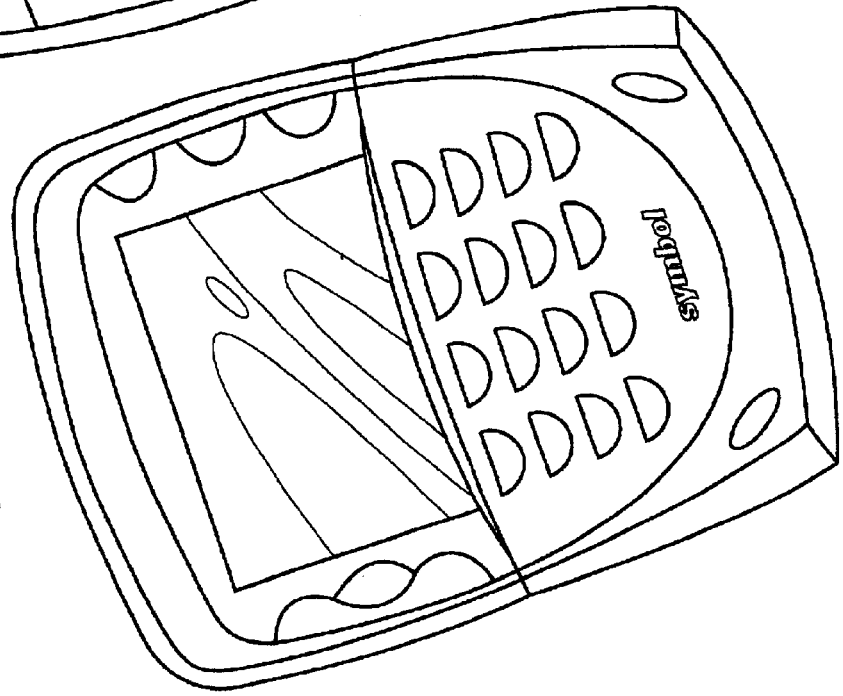

FIGS. 17A-17C show a further alternative embodiment for the housing of the portable data collection device.

Figure 18B:
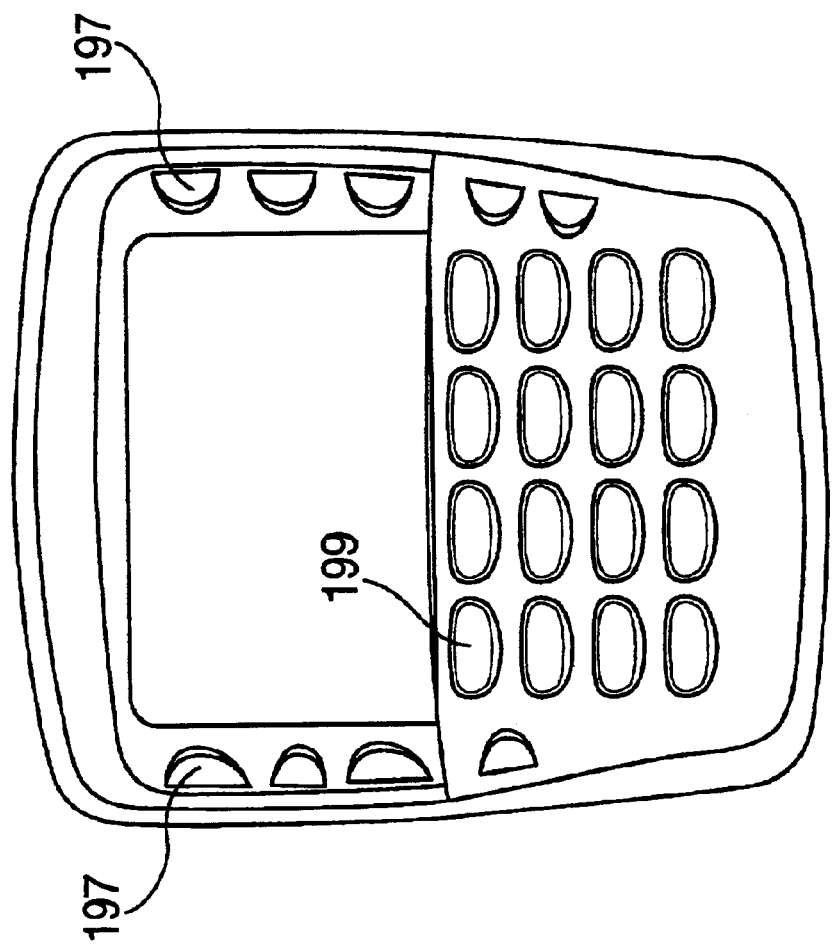
Figure 18A:
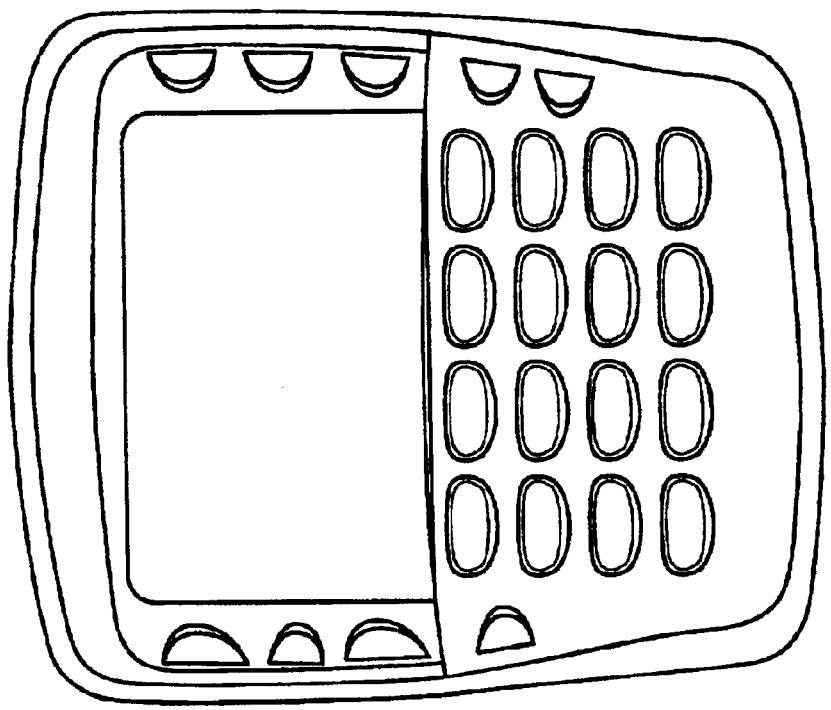

FIGS. 18A and 18B show two additional embodiments wherein the keys of the keypad and the function keys 39 are assigned specific values and functions. The construction of the device shown in FIGS. 18A and 18B is shown in more detail in FIGS. 19A and 19B. In this embodiment, the device comprises the back housing 191 which has the battery pack cover 192 mounted thereon with latch 193. Mounted between the back housing 191 and the top housing 195 is the display and keypad 194 with the display light pipes 199 thereover forming the keys shown in FIG. 18B, the function keys 197 and the LED displays 198. On top of the top housing is the external membrane keypad 196 which receives the lenses 199 for key actuation against the touch sensitive display 194.

Figure 20C:
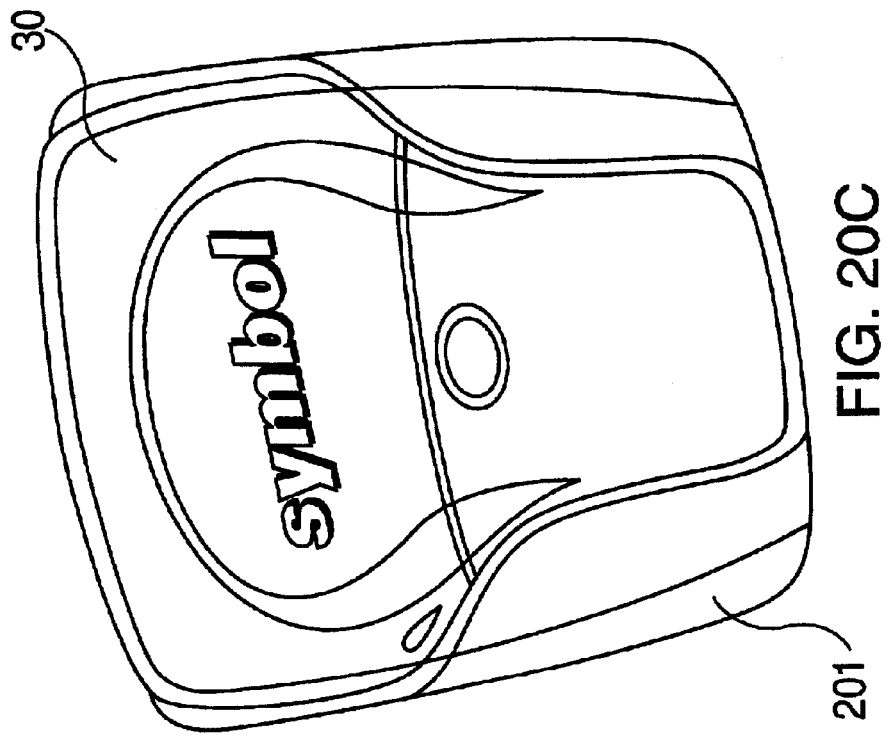
Figure 20B:
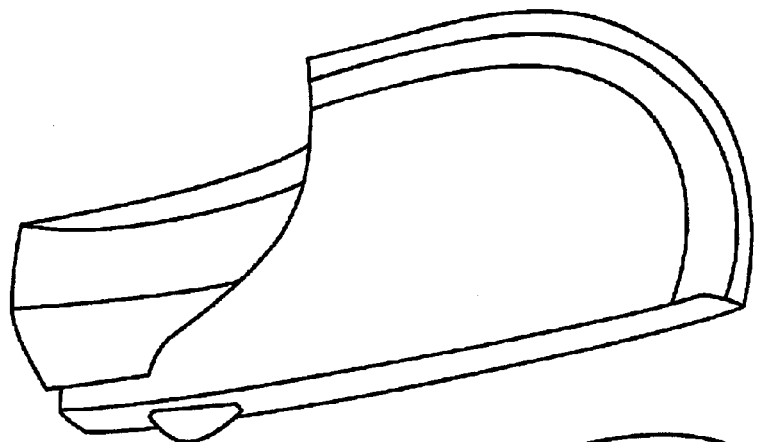
Figure 20A:
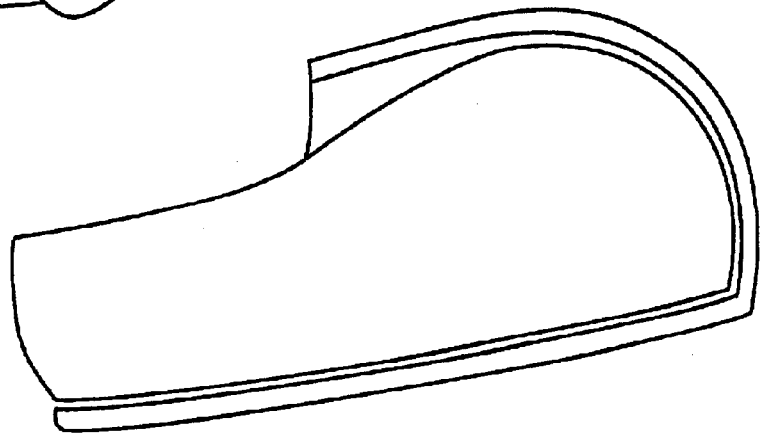

FIGS. 20A-20C show different views of a holster 201 which slidably receives the portable data collection device 30 therein. As shown in FIGS. 21A and 21B, the holster 211, in an alternative embodiment, can have a clip 212 so it can be worn on a belt or other clothing having a waistband.

FIGS. 22 and 23 show a wearable system in accordance with the invention wherein the portable data collection device 10 is worn on a belt and the data transmitting unit 20 is a ring scanner worn on the finger and shown in more detail in FIG. 23. A headset 30 is provided with a voice input, such as a microphone, and an optional display output.

In accordance with the invention, the data transmitting unit 20 can be associated with a portable data collection device 10 in the field by providing each data transmitting unit with a unique identification. The field association can take place by the data transmitting unit 20 reading a bar code associated with the portable data collection device and preferably affixed thereto. The processor in the portable data collection device 10 can also receive the unique identification of the transmitting unit 20 through the manual data entry circuitry, i.e., the keyboard of the device. Moreover, the data transmitting unit can be cradled and the identification data relating to the device can then be transmitted to the portable data collection device through the cradle to do the field association.

The barcode for the field association can be disposed on the back of the housing of the portable data collection device and the scanning of the barcode would then effect a transmission of the data from the barcode along with an identification code for the scanner to associate the scanner and collection device. Alternatively, one could enter the serial number of a scanner manually via the keyboard.

The data transmitting unit 20 preferably has a rechargeable battery, and when it is cradled, the battery is recharged.

The keypad configuration shown in FIGS. 18B and 19A and B can be reconfigured by the processor in accordance with the invention. For example, the keypad 199 in FIG. 18B has keys AB, CD, EF . . . Those letters are displayed on the display below the lenses 199 so that they appear at the surface of the keys 199, since the lenses are in the form of light pipes. It is clear that the processor, instead of displaying letters, could display numbers to allow the user to change the keypad from a alphabetic to a numeric keypad. Moreover, the ends of the light pipes can have lenses thereon to magnify the displayed alphanumeric. Moreover, the light pipes 199 and membrane 196 can be mounted for sliding displacement away from the display to enlarge the display area for use by the processor or can be hingedly mounted for movement away from the display.

Alternatively, the processor can control the display to have icons displayed on the display and through the keypad light pipes so that the actuation of the icon carries out a function illustrated by the icon. Moreover, the actuation of a function key, for example on the display, would cause the processor to change the key array below the light pipe 199 so that for that particular operation a different keyboard is provided. Thus, the processor can reconfigure the array of alphanumerics and icons for different operations.

For example, the processor can reconfigure the array on the display to display at least one start scan key to initiate scanning on the data transmitting unit 20. In that regard, preferably a start scan key can be provided for a right handed user and for a left handed user.

The icons can be used to represent canned messages, so that the pressing of a single key will deliver a frequently used message to the recipient. Moreover, the keypad can be a smart keypad, as controlled by the processor to anticipate the user by changing between alphabetical and numerical, between lower case and upper case, etc., based upon the actions of the user. The device can also provide word completion.

As shown in FIG. 19A and B and FIG. 18B, the light pipes 199 are mounted on the resilient member 196 for movement towards and away from the display. When the light pipe touches the display, it acts to actuate the key thereunder, because the display is touch sensitive.

The system also has the ability to initiate a scan in a manner to stagger the start up of the individual elements of the data transmitting unit for the purposes of power management.

Moreover, the processor monitors the distance of the transmitting unit from the portable data collection device to indicate when the distance exceeds a given distance. This can be used to prevent theft and it can be used to warn the user so that the user does not exceed the communication distance of the short range communication protocol.

The portable data collection device can also manage power with the associated data transmitting units by agreeing with each unit to transmit only at given time intervals. This enables the devices to otherwise go into a lower power mode, such as is available with Bluetooth when their time slots are not available. Alternatively, the data collection device can block the signals from other units when it is receiving data from a selected unit. The data collection devices are also able to communicate with the data transmitting units to detect the remaining available power image unit and to indicate the power status to the user accordingly. Thus the data collection device would provide a gas tank indicator for each ring scanner. Similarly, the data collection device could transmit the same data to the host.

While not shown in the drawings, the portable data collection units preferably also have a connector or slot for receiving a PC card so as to add additional functionality to the device. In addition to the PC card, a slot or connector can be provided for a springboard card, a compact flash card or the like.

Additionally, the portable data collection device can have an indentation in the rear of the housing for receiving the data transmitting unit to mechanically hold same and a connector or contacts for electrically connecting thereto. In this manner, data can be transmitted between the two units, the batteries in the data transmitting unit can be recharged and/or the devices can be field associated.

The housing of the portable data collection device can have two separate sections having bosses for connecting the sections together and the bosses can be overmolded with shock resistant material to provide a shock mount for the components in the housing.

Moreover, a scan module can be provided in the housing of the portable data collection device and the scan module need only have a window for scanning and communicating the scanned information to the processor. Preferably, the scan module is mounted in the housing for pivotal movement and has a manually actuated member on the outside of the housing for pivoting the scan module.

The scanner module can make use of an imager and the portable data collection device can transmit images to the host or other data collection devices. Voice over IP from the headset can also be transmitted from each data collection device to other data collection devices or to the host. One can use the data collection device touch screen for signature capture and fro transmittal to other devices or to the host for verification. Moreover, the data collection devices can act as a two-way pager to connect to one another or to the host.

The host can be connected to the internet to allow the portable data device to communicate with other such devices via the internet. Alternatively, the portable data collection devices can have the ability to be connected via a wireless network to the internet by a WAP protocol.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A data collection system comprising:
   at least one data transmitting unit for scanning bar codes and for producing a decode signal representative of a scanned bar code and having communication circuitry for the wireless transmission of the decode signal over a short range using a first protocol; and
   a portable data collection device comprising a display, manual data entry circuitry, a processor for receiving entered data and for controlling the display, a first communication circuit for receiving data from the at least one data transmitting unit using the first protocol over a short range and a second communication circuit using a second protocol for wireless transmitting and receiving of data over a long range from a host;
   the processor being configured to controls the display to depict a keypad array of discrete keypad areas, each representing at least one of alphanumerics and icons on the display and corresponding to data to be entered by actuating same and wherein the processor reconfigures the array of alphanumerics and icons for different operations, the depicted keypad array including at least one start scan key to initiate scanning on the at least one data transmitting unit, the processor reconfiguring a position of the start scan key on the display to depict a start scan key for a right handed user and for a left handed user.

2. The data collection system according to claim 1, wherein the at least one data transmitting unit comprises a light source, a scan element, a scan motor for moving the scan element, a photodetector, signal processing circuitry for receiving a signal from the photodetector, triggering circuitry for initiating a scan, and power management circuitry for controlling the light source, scan motor and signal processing circuitry to stagger the activation thereof upon the initiating of a scan by the triggering circuitry.

3. The data collection system according to claim 2, wherein the at least one data transmitting unit further comprises decode circuitry for decoding the signal received from the photodetector.

4. The data collection system according to claim 1, further comprising a headset receptive of a voice input for producing voice signals and having communication circuitry for the wireless transmission of the voice signals over a short range using the first protocol.

5. The data collection system according to claim 1, wherein the processor monitors the distance of the at least one data transmitting unit from the portable data collection device to indicate when the distance exceeds a given distance.

6. The data collection system according to claim 1, wherein the portable data collection device has a cradle for docking at least one data transmitting unit.

7. The data collection system according to claim 1, wherein the at least one data transmitting unit is associated with the portable data collection device and wherein the device communicates with each unit to lower the transmit power thereof.

8. A data collection system comprising:
   at least one data transmitting unit for reading data indicia and for producing a decode symbol representative of a read data indicia and having communication circuitry for the wireless transmission of the decode signal over a short range using a first protocol; and
   a portable data collection device comprising a display, manual data entry circuitry, a processor for receiving entered data and for controlling the display, a first communication circuit for receiving data from the at least one data transmitting unit using the first protocol over a short range and a second communication circuit using a second protocol for wireless transmitting and receiving of data over a long range from a host;
   wherein the at least one data transmitting unit is associated with the portable data collection device and where the data collection device communicates with the at least one data transmitting unit to detect the remaining available power in the at least one data transmitting unit to indicate the respective power status to the user.

9. The data collection system of claim 8, wherein the data indicia comprise bar codes.

10. The data collection system of claim 9, wherein the data-transmitting unit comprises a laser beam scanner.

11. The data collection system of claim 9, wherein the data-transmitting unit comprises a solid state imaging device.

12. The data collection system of claim 8, wherein the data indicia comprise radio frequency tags.

13. A portable data collection device comprising: a display; manual data entry circuitry; a processor for receiving entered data and for controlling the display; a first wireless communication circuit for receiving data using a first protocol over short range from at least one data transmitting unit; a second wireless communication circuit using a second protocol for transmitting and receiving data over a long range from a host; and a housing for the display, manual entry circuitry, processor and communication circuits, wherein the housing has two separate sections having bosses for connecting the sections together and wherein the bosses are overmolded with shock resistant material to provide a shock mount for components in the housing.

* * * * *